US012765443B2

(12) United States Patent
Siever et al.

(10) Patent No.: US 12,765,443 B2
(45) Date of Patent: Oct. 20, 2026

(54) SYSTEMS AND METHODS FOR CONTROLLING CROP MANAGEMENT EQUIPMENT

(71) Applicant: Dowdy Crop Innovations, LLC, Marion, OH (US)

(72) Inventors: Randall Leon Siever, Lexington, KY (US); Randy Dowdy, Lexington, KY (US); Robert Colin Montgomery Willis, Lexington, KY (US)

(73) Assignee: DOWDY CROP INNOVATIONS, LLC, Marion, OH (US)

( * ) Notice: Subject to any disclaimer, the term of this patent is extended or adjusted under 35 U.S.C. 154(b) by 49 days.

(21) Appl. No.: 18/779,558

(22) Filed: Jul. 22, 2024

(65) Prior Publication Data

US 2025/0017131 A1 Jan. 16, 2025

Related U.S. Application Data

(63) Continuation-in-part of application No. 17/508,505, filed on Oct. 22, 2021, now abandoned.

(Continued)

(51) Int. Cl.

*A01B 79/02* (2006.01)
*A01B 79/00* (2006.01)

(Continued)

(52) U.S. Cl.

CPC ............ *A01B 79/02* (2013.01); *A01B 79/005* (2013.01); *G06Q 30/0283* (2013.01); *G06Q 50/02* (2013.01)

(58) Field of Classification Search

None

See application file for complete search history.

(56) References Cited

U.S. PATENT DOCUMENTS

| | | | |
|---|---|---|---|
| 6,505,146 | B1 | 1/2003 | Blackmer |
| 2002/0035431 | A1 | 3/2002 | Ell |

(Continued)

FOREIGN PATENT DOCUMENTS

| | | | |
|---|---|---|---|
| FR | 2940883 A1 | 7/2010 | |
| IN | 201641016250 A | 5/2016 | |

(Continued)

OTHER PUBLICATIONS

Williams et al. "The EPIC crop growth model." Transactions of the ASAE 32.2 (1989): 497-0511. Apr. 1989 (Apr. 1989), retrieved on Dec. 21, 2021 from < https://elibrary.asabe.org/abstract.asp?aid=31032>, entire document.

(Continued)

*Primary Examiner* — Peter D Nolan
*Assistant Examiner* — Jacob Kent Besteman-Street
(74) *Attorney, Agent, or Firm* — Dinsmore & Shohl LLP

(57) ABSTRACT

Embodiments provided herein include systems and methods for controlling crop management equipment. One embodiment includes providing a yield goal for a field from a grower, receiving tissue samples for at least one crop in the field and a seed population for the field, and interpolating individual field grid point values of the field. Some embodiments include predicting a growth plan of water and nutrient applications to meet the yield goal, based on determined sufficiency levels and individual field grid point values of the field, predicting whether the growth plan includes a component that is unlikely to be met, and in response to predicting that the growth plan includes the component that is unlikely to be met, providing the component that is unlikely to be met to a user. Some embodiments include providing an option for the grower to alter the yield goal such that the component is likely to be met.

18 Claims, 34 Drawing Sheets

Related U.S. Application Data

(60) Provisional application No. 63/104,986, filed on Oct. 23, 2020.

(51) Int. Cl.
*G06Q 30/0283* (2023.01)
*G06Q 50/02* (2024.01)

(56) References Cited

U.S. PATENT DOCUMENTS

| | | | | |
|---|---|---|---|---|
| 2003/0019152 | A1* | 1/2003 | Raun | A01C 21/007 47/58.1 SC |
| 2003/0019408 | A1* | 1/2003 | Fraisse | A01B 79/005 111/100 |
| 2004/0231239 | A1* | 11/2004 | Raun | A01C 21/007 47/58.1 SC |
| 2007/0255502 | A1* | 11/2007 | Pruett | G06Q 50/02 702/19 |
| 2008/0131924 | A1 | 6/2008 | Cope et al. | |
| 2009/0298539 | A1* | 12/2009 | Anderson | G05D 1/0225 455/556.1 |
| 2012/0101861 | A1 | 4/2012 | Lindores | |
| 2014/0035752 | A1 | 2/2014 | Johnson | |
| 2014/0089045 | A1 | 3/2014 | Johnson | |
| 2014/0278731 | A1* | 9/2014 | Griffin | G06Q 50/02 705/7.28 |
| 2016/0202227 | A1 | 7/2016 | Mathur et al. | |
| 2016/0223506 | A1 | 8/2016 | Shriver et al. | |
| 2016/0224703 | A1 | 8/2016 | Shriver | |
| 2017/0045488 | A1 | 2/2017 | Riess et al. | |
| 2017/0270446 | A1* | 9/2017 | Starr | G06Q 10/06313 |
| 2018/0049364 | A1* | 2/2018 | Campisi-Pinto | A01C 21/007 |
| 2018/0132423 | A1 | 5/2018 | Rowan et al. | |
| 2018/0315100 | A1* | 11/2018 | Magnusson | G06Q 30/0283 |
| 2018/0322426 | A1 | 11/2018 | Schmaltz et al. | |
| 2019/0050948 | A1 | 2/2019 | Perry et al. | |
| 2019/0090432 | A1 | 3/2019 | Duquette et al. | |
| 2020/0128721 | A1* | 4/2020 | Lewis | G01N 33/24 |
| 2020/0250593 | A1 | 8/2020 | Peters et al. | |
| 2020/0396976 | A1* | 12/2020 | Aronov | G06V 20/188 |
| 2021/0231632 | A1 | 7/2021 | Borgman et al. | |

FOREIGN PATENT DOCUMENTS

| | | | |
|---|---|---|---|
| IN | 202141002169 | A | 1/2021 |
| IN | 202121010953 | A | 3/2021 |
| WO | WO2019148993 | A1 | 8/2019 |
| WO | WO2020229987 | A1 | 11/2020 |

OTHER PUBLICATIONS

International Search Report and Written Opinion issued in corresponding PCT Application No. PCT/US2021/056239, mailed on Feb. 2, 2022.

"Crop Manager" application found on Google Play and accessed Sep. 16, 2021.

Non-Final Rejection issued in the corresponding Utility U.S. Appl. No. 17/508,505, mailed on Jun. 27, 2023.

Final Rejection issued in the corresponding Utility U.S. Appl. No. 17/508,505, mailed on Jan. 24, 2024.

* cited by examiner

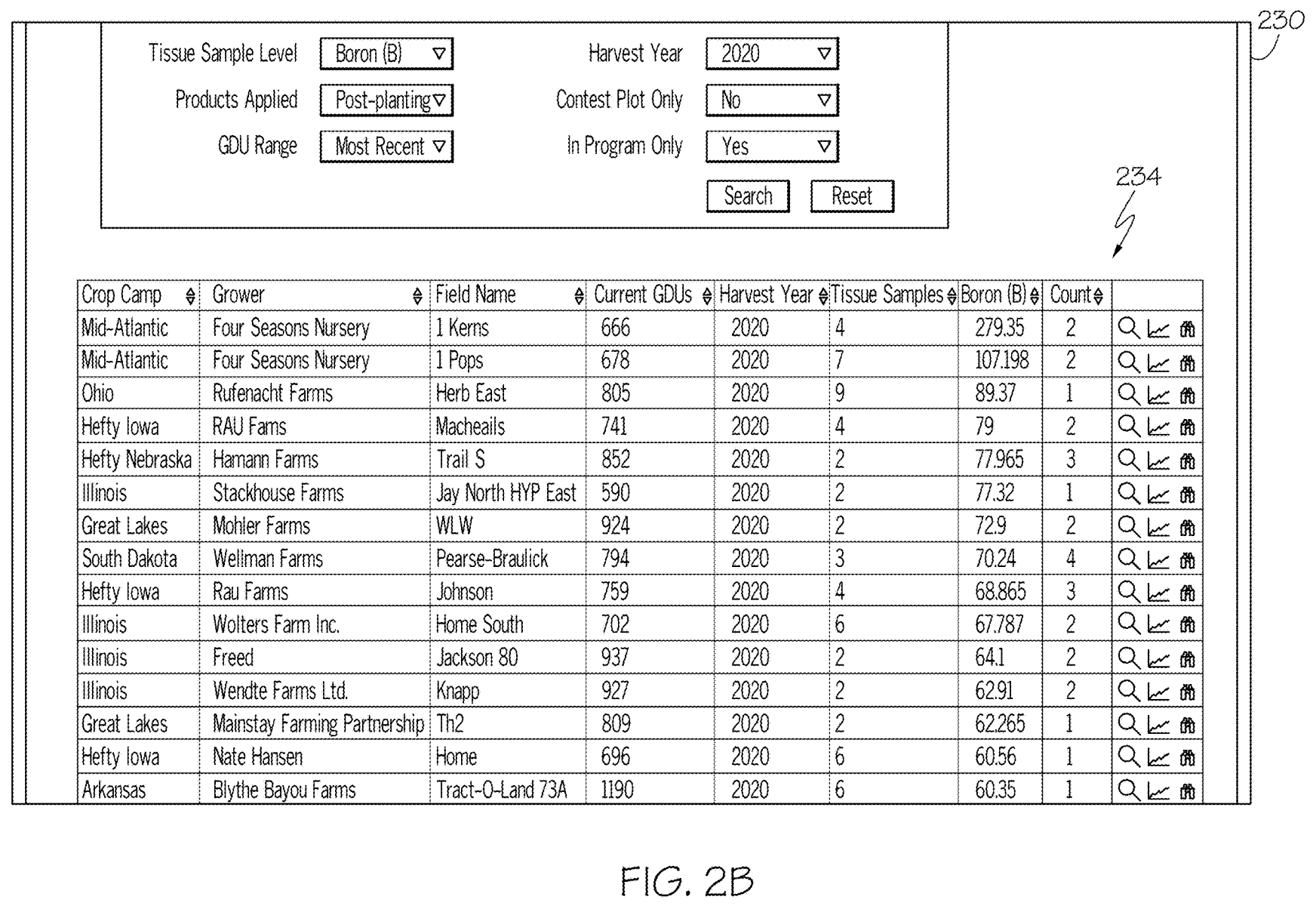

230

Tissue Sample Level: Boron (B)
Products Applied: Post-planting
GDU Range: Most Recent
Harvest Year: 2020
Contest Plot Only: No
In Program Only: Yes Search Reset

234

| Crop Camp | Grower | Field Name | Current GDUs | Harvest Year | Tissue Samples | Boron (B) | Count | |
|---|---|---|---|---|---|---|---|---|
| Mid-Atlantic | Four Seasons Nursery | 1 Kerns | 666 | 2020 | 4 | 279.35 | 2 | |
| Mid-Atlantic | Four Seasons Nursery | 1 Pops | 678 | 2020 | 7 | 107.198 | 2 | |
| Ohio | Rufenacht Farms | Herb East | 805 | 2020 | 9 | 89.37 | 1 | |
| Hefty Iowa | RAU Fams | Macheails | 741 | 2020 | 4 | 79 | 2 | |
| Hefty Nebraska | Hamann Farms | Trail S | 852 | 2020 | 2 | 77.965 | 3 | |
| Illinois | Stackhouse Farms | Jay North HYP East | 590 | 2020 | 2 | 77.32 | 1 | |
| Great Lakes | Mohler Farms | WLW | 924 | 2020 | 2 | 72.9 | 2 | |
| South Dakota | Wellman Farms | Pearse-Braulick | 794 | 2020 | 3 | 70.24 | 4 | |
| Hefty Iowa | Rau Farms | Johnson | 759 | 2020 | 4 | 68.865 | 3 | |
| Illinois | Wolters Farm Inc. | Home South | 702 | 2020 | 6 | 67.787 | 2 | |
| Illinois | Freed | Jackson 80 | 937 | 2020 | 2 | 64.1 | 2 | |
| Illinois | Wendte Farms Ltd. | Knapp | 927 | 2020 | 2 | 62.91 | 2 | |
| Great Lakes | Mainstay Farming Partnership | Th2 | 809 | 2020 | 2 | 62.265 | 1 | |
| Hefty Iowa | Nate Hansen | Home | 696 | 2020 | 6 | 60.56 | 1 | |
| Arkansas | Blythe Bayou Farms | Tract-O-Land 73A | 1190 | 2020 | 6 | 60.35 | 1 | |

FIG. 2B

| Field Name | Current GDUs | Acreage | Last Growing Season | |
|---|---|---|---|---|
| Arlins | 771 | 50.90 | 2020 | |
| Brett's test Field | 3268 | 21.79 | Brett's test season | |
| Bucks | 675 | 43.18 | 2020 | |
| Campbells | 3443 | 54.18 | 2019 | |
| Darren's | 750 | 42.59 | 2020 | |
| Darren's 27 | 670 | 25.82 | 2020 | |
| Harold 48 | 675 | 47.73 | 2020 | |
| Home 189 | 675 | 182.19 | 2020 | |
| Mc Test | 0 | 21.79 | Soil Fert Rec Test | |
| My 215 | 0 | 244.98 | 2020 | |
| My215 | 0 | 21.79 | 2020 | |
| Test Rec 2020 | 0 | 15.876 | 2020 | |
| TS TEST | 856 | 49.57 | 33 | |
| Willis Drake 75 | 771 | 75.55 | 2020 | |
| Willis East | 750 | 67.62 | 2020 | |
| Willis South | 750 | 39.16 | 2020 | |

1930

View Performance

Field Name Wilson
Yield Goal 250.00
Crop Corn
Sample Site High Yield (H1) ▾

| Date | GDUs | 💧 | N2 | P | K | Mg | Ca | So | Zn | Mn | Cu | Fe | B | Al | Mo | Na |
|---|---|---|---|---|---|---|---|---|---|---|---|---|---|---|---|---|
| 05/26/2020 | 422 | - | 4.92% | 0.19% | 3.17% | 0.23% | 0.6% | 0.24% | 40.56 ppm | 108.9 ppm | 8.85 ppm | 282.7 ppm | 3.97 ppm | 0 ppm | 0.48 ppm | 0.62 ppm |
| 06/01/2020 | 537 | 0.8 in | 4.82% | 0.06% | 3.4% | 0.12% | 0.53% | 0.21% | 64.4 ppm | 56.45 ppm | 59.85 ppm | 181 ppm | 23.4 ppm | 0 ppm | 3.06 ppm | 0.3 ppm |
| 06/08/2020 | 718 | 0.5 in | 4.4% | 0.2% | 3% | 0.23% | 0.67% | 0.35% | 25.08 ppm | 62.57 ppm | 13.63 ppm | 87.94 ppm | 10.7 ppm | 0 ppm | 1.4 ppm | 890 ppm |
| 06/15/2020 | 881 | 0.5 in | 3.54% | 0.28% | 2.27% | 0.15% | 0.37% | 0.22% | 31.75 ppm | 46.64 ppm | 15.25 ppm | 146.1 ppm | 9.62 ppm | 0 ppm | 0.28 ppm | 50 ppm |
| 06/22/2020 | 1039 | 0.8 in | 3.56% | 0.28% | 2.32% | 0.15% | 0.31% | 0.21% | 39.38 ppm | 47.94 ppm | 13.41 ppm | 140.1 ppm | 12.61 ppm | 0 ppm | 0.73 ppm | 80 ppm |
| 06/29/2020 | 1223 | 1.7 in | 3.75% | 0.34% | 1.54% | 0.16% | 0.39% | 0.24% | 52.11 ppm | 76.43 ppm | 14.2 ppm | 119.1 ppm | 27.43 ppm | 0 ppm | 2.56 ppm | 30 ppm |
| 07/06/2020 | 1413 | 2.1 in | 4.53% | 0.44% | 2.02% | 0.13% | 0.36% | 0.24% | 64.04 ppm | 118 ppm | 14.39 ppm | 165.7 ppm | 34.52 ppm | 0 ppm | 0.97 ppm | 40 ppm |
| 07/13/2020 | 1610 | 0 in | 3.47% | 0.3% | 1.86% | 0.22% | 0.8% | 0.23% | 33.85 ppm | 66.05 ppm | 12.81 ppm | 96.75 ppm | 11.35 ppm | 0 ppm | 1.46 ppm | 40 ppm |
| 07/20/2020 | 1808 | 0.7 in | 3.5% | 0.28% | 1.83% | 0.2% | 0.87% | 0.14% | 28.8 ppm | 45.26 ppm | 8.69 ppm | 116.3 ppm | 10.3 ppm | 0 ppm | 0.97 ppm | 40 ppm |
| 07/27/2020 | 2010 | 1.2 in | 2.64% | 0.25% | 1.75% | 0.18% | 0.62% | 0.17% | 59.16 ppm | 52.03 ppm | 13.13 ppm | 147.8 ppm | 5.29 ppm | 0 ppm | 1.33 ppm | 30 ppm |

FIG. 19

SYSTEMS AND METHODS FOR CONTROLLING CROP MANAGEMENT EQUIPMENT

TECHNICAL FIELD

Embodiments described herein generally relate to systems and methods for controlling crop management equipment and, more specifically, to embodiments for determining yield-based assessments of crops and utilizing that information to control and/or alter operation of crop management equipment, such as tractors, seeders, harvesters, etc.

BACKGROUND

Crop management has evolved over the years, integrating more computer algorithms and other analysis techniques to improve crop output. However, oftentimes, growers do not realize that the return on investment of crop inputs do not justify their costs. Additionally, many growers are not aware of other factors that limit output of a crop or field or otherwise limit the return on investment. Thus, a need for systems and methods for crop management exists in the industry.

SUMMARY

Embodiments provided herein include systems and methods for controlling crop management equipment. One embodiment of a method includes providing, by a computing device, a yield goal for a field from a grower, receiving, by the computing device, tissue samples for at least one crop in the field and a seed population for the field, and interpolating, by the computing device, individual field grid point values of the field. Some embodiments include predicting, by the computing device, a growth plan of water and nutrient applications to meet the yield goal, based on determined sufficiency levels and individual field grid point values of the field, predicting, by the computing device, whether the growth plan includes a component that is unlikely to be met, and in response to predicting that the growth plan includes the component that is unlikely to be met, providing, by the computing device, the component that is unlikely to be met to a user. Some embodiments include providing, by the computing device, an option for the grower to alter the yield goal such that the component is likely to be met.

One embodiment of a system includes a computing device that includes logic, that when executed by the computing device, causes the system to provide a yield goal for a crop from a grower, receive tissue samples for at least a portion of the crop and a seed population for the crop, and interpolate individual field grid point values of the crop. In some embodiments, the logic causes the computing device to predict a growth plan of water and nutrient applications to meet the yield goal, based on determined sufficiency levels and individual field grid point values of the crop, predict whether the growth plan includes a component that is unlikely to be met, and in response to predicting that the growth plan includes the component that is unlikely to be met, provide the component that is unlikely to be met to a user. In some embodiments, the logic causes the computing device to provide an option for the grower to alter the yield goal such that the component is likely to be met.

Some embodiments of a non-transitory computer-readable medium include logic that, when executed by a computing device, causes the computing device to provide a yield goal for a plurality of crops, receive tissue samples for at least a portion of the plurality of crops and a seed population for the plurality of crops, and interpolate individual field grid point values of the plurality of crops. In some embodiments, the logic causes the computing device to predict a growth plan of water and nutrient applications to meet the yield goal, based on determined sufficiency levels and individual field grid point values of at least a portion of the plurality of crops, predict whether the growth plan includes a component that is unlikely to be met, and in response to predicting that the growth plan includes the component that is unlikely to be met, provide the component that is unlikely to be met to a user. In some embodiments, the logic causes the computing device to provide an option for to alter the yield goal such that the component is likely to be met.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIGS. 2A, 2B depict another user interface for managing fields, according to embodiments provided herein;

FIG. 19 depicts a user interface for providing nutrient data relative to yield goals, according to embodiments provided herein;

DETAILED DESCRIPTION

Embodiments disclosed herein include systems and methods for controlling crop management equipment. Some embodiments are configured to take a yield-based approach to recommend a growth plan that includes a planting and/or growing course of action. As an example, a user option may be provided for a user to identify a desired yield for a predetermined field, at least one crop, and/or farm. Based on tissue samples, seed population, and/or other data, embodiments provided herein may determine and recommend prescribed water, prescribed nutrient, and/or other actions to take with the crop and/or field to reach the specified yield. These embodiments may be helpful to the user in that, if the desired yield is not a possibility, these embodiments may indicate such and the user may adjust the desired yield to a more reasonable expectation and recommended actions may be provided.

Similarly, some embodiments may be configured to perform a flag test and utilize the flag test to identify an uneven emergence tax on a field. Some embodiments may also make recommendations in subsequent grow cycles to reduce and/or eliminate the emergence tax on a field. Some embodiments may be configured to provide soil recommendations based on soil nutrient values and yield goals. Some embodiments may provide specific product recommendations based on observed results from other growers' previous data. Some embodiments may take tissue samples based on yield goal, time of year, and planting population. Some embodiments may perform a planter variability study. Some embodiments provide options for growers to share information and targets and may search successful strategies for other growers. Some embodiments provide a product and timing-specific roadmap and/or timing-specific push/text alerts (in line with roadmap). The systems and methods for crop management incorporating the same will be described in more detail, below.

Figure 1:
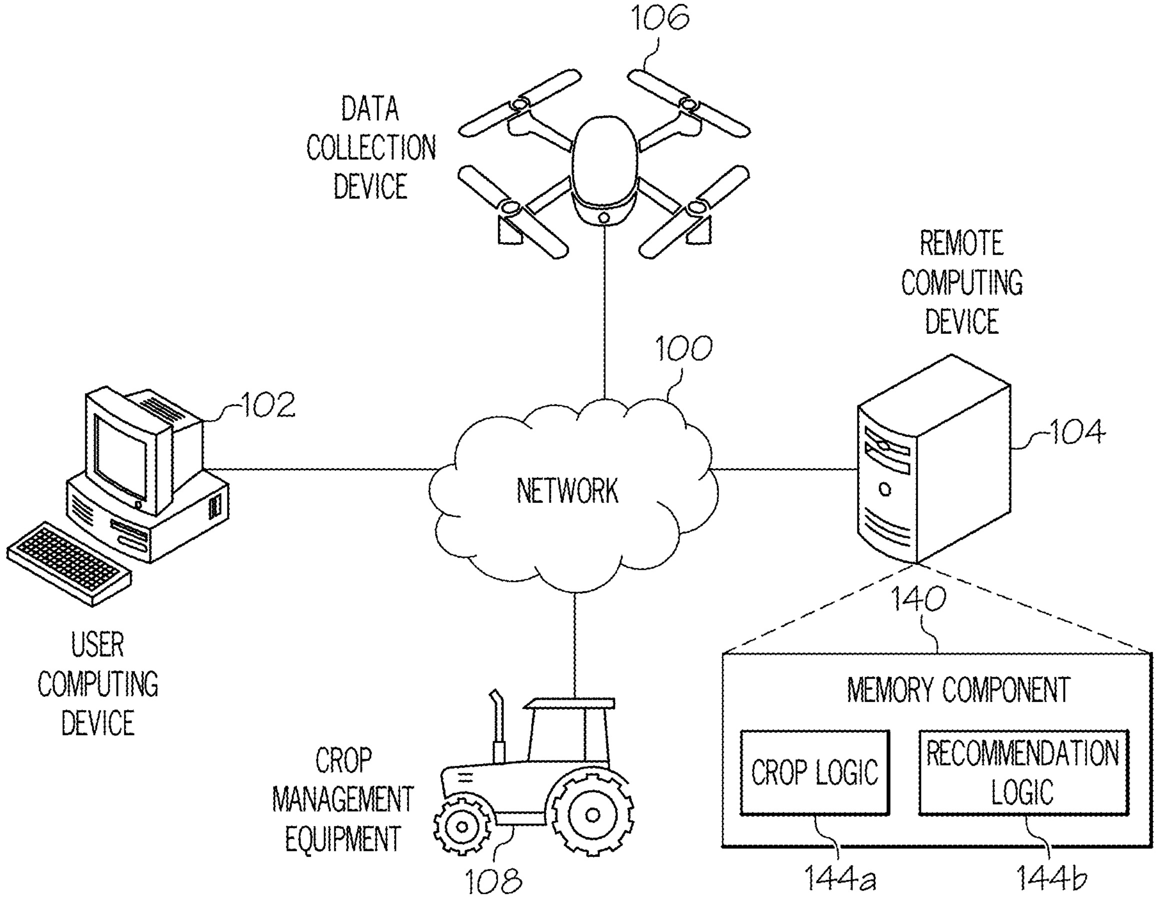
FIG. 1 depicts a computing environment for providing crop management, according to embodiments provided herein.

Referring now to the drawings, FIG. 1 depicts a computing environment for controlling crop management equipment, according to embodiments provided herein. As illustrated, the network environment may include a network 100, such as the internet, public switched telephone network, mobile telephone network, mobile data network, local network (wired or wireless), peer-to-peer connection, and/or other network for providing the functionality described herein.

Coupled to the network 100 are a user computing device 102, a remote computing device 104, a data collection device 106, and crop management equipment 108. The user computing device 102 may represent one or more computing device, which may take the form of a personal computer, laptop, mobile device, and/or other device for receiving user input and providing other functionality described herein. Additionally, the user computing device 102 may represent a computing device that is utilized by a grower, an administrator, and/or a third party and thus may include a plurality of computing devices.

The remote computing device 104 also represents one or more different computing devices for providing the functionality provided herein and, as such, may be configured as a server, a personal computer, tablet, database, mobile device, and/or other computing device. The remote computing device 104 may include a memory component 140, which may store crop logic 144*a* and recommendation logic 144*b*. The crop logic 144*a* may be configured to cause the remote computing device 104 to receive data related to a particular crop, field, and/or nutrient and accumulate historical data regarding the same. Similarly, the recommendation logic 144*b* may be configured to cause the remote computing device 104 to make determinations and/or recommendations, as described in more detail below.

The data collection device 106 may represent one or more sensors, drones, satellites, and/or other devices for collecting data, as described herein. As described in more detail below, the data collection device 106 may include a vehicle, such as an aerial vehicle, a terrestrial vehicle, and/or other vehicle for traversing a field, a crop, and/or a plurality of crops. The vehicle may be equipped with one or more sensors, such as camera, pH sensor, moisture sensor, nutrient sensor, and/or other sensor for testing soil quality, plant growth, and/or crop growth. The data collection device 106 may also be configured with hardware and/or software for collecting and storing tissue samples for a plant or crop. These samples may be analyzed by the data collection device 106 and/or taken to a laboratory for analysis. The data collection device 106 may also include and/or be configured with a computing device for receiving and storing data received from the sensor. The data collection device 106 may also include hardware and/or software for communicating data to the user computing device 102 and/or the remote computing device 104. Similarly, the data collection device 106 may also include hardware and/or software for navigating one or more portions of a crop of interest.

The crop management equipment 108 may include a tractor, seeder, harvester, fertilizing equipment, sprayer, and/or other hardware for managing the planting, management, and/or harvesting of a crop. Depending on the particular embodiment, the crop management equipment 108 may be automatically controlled by the remote computing device 104 and/or may be semi-autonomous with instructions received from the remote computing device 104. As described in more detail below, embodiments herein may be configured such that the crop management equipment 108 is autonomous, semi-autonomous, and/or otherwise assisted in operation. As such, embodiments provided herein may be configured to alter operation of the crop management equipment 108 to implement the growth plan.

Figure 2A:
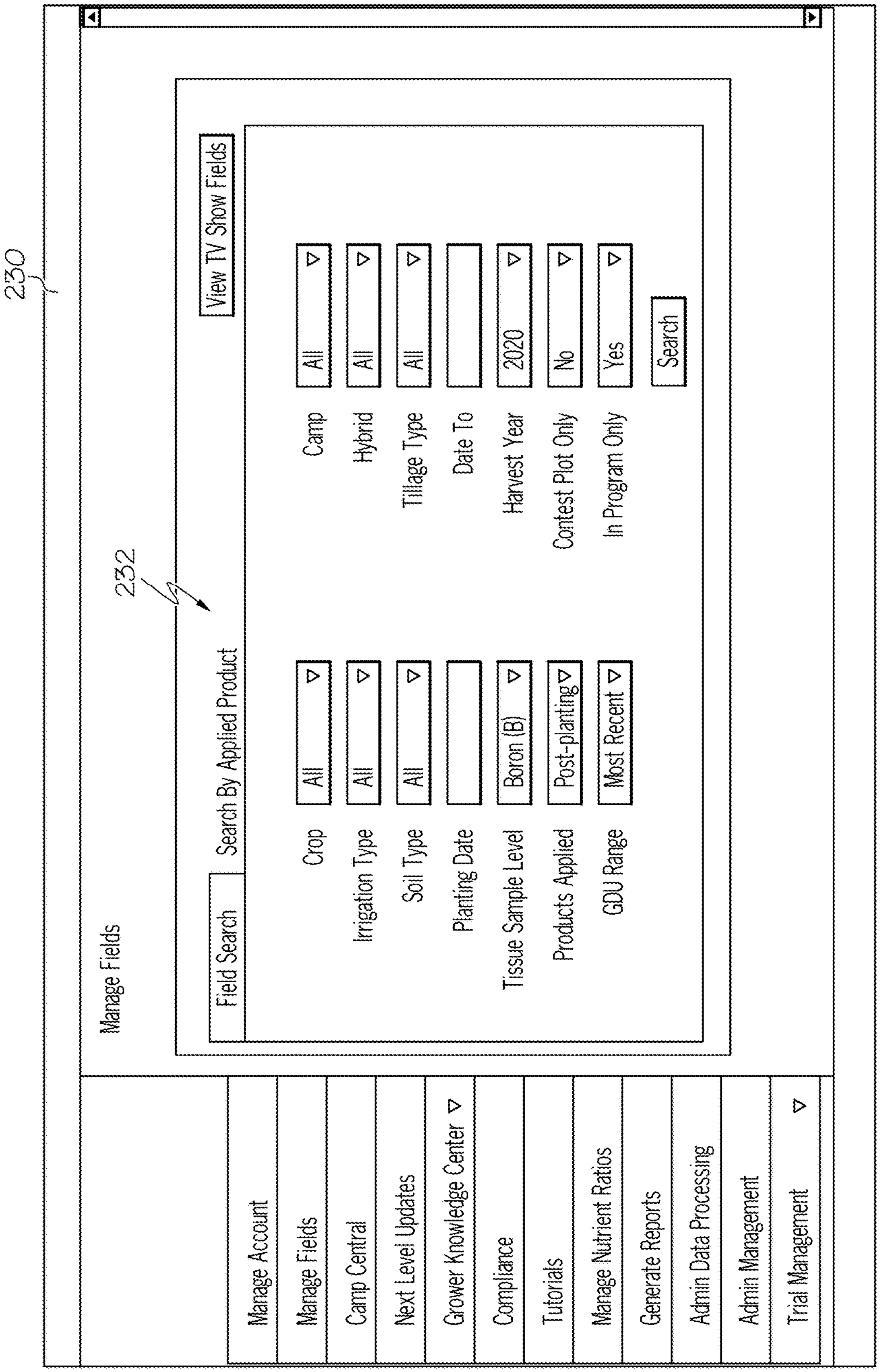

FIGS. 2A, 2B depict a user interface 230 for managing fields, according to embodiments provided herein. As illustrated in FIG. 2A, the user interface 230 provides a field form 232 for entering data related to a crop. Specifically, the field form 232 includes crop option, an irrigation type option, a soil type option, a planting data option, a tissue sample level option, a products applied option, a GDU range option, a camp option, a hybrid option, a tillage type option, a date option, a harvest year option, a contest plots option, and a program option.

In response to selection of the crop option, the user may select a crop from a listing of crops that are managed by the remote computing device 104. In response to selection of the irrigation type option, the user may identify the type of irrigation system being used by the grower. In response to selection of the soil type option, the user may select a soil type. In response to selection of the planting date option, a date the current crop was planted may be entered. In response to selection of the tissue sample level option is entered, levels of tissue samples may be selected.

In response to selection of the camp option, a camp may be selected. In response to selection of the hybrid option, a hybrid may be selected. In response to selection of the tillage type option, a type of tillage that has been used on this field may be selected. In response to selection of the date option, a date for monitoring may be selected. In response to selection of the harvest year option, a harvest year may be selected. In response to selection of the contest plots option, and indication of whether contest plots are present on this field may be provided. In response to selection of the program option, an indication of whether the crop is only in program may be provided.

FIG. 2B depicts another portion of the user interface 230, and provides a crop camp chart 234. The crop camp chart 234 includes a crop camp column, a grower column, a field name column, a current GDU column, a harvest year column, a tissue sample column, a boron column, and a count column. As illustrated, the camp column provides a crop camp for the depicted field. The grower column provides a name of a grower of the depicted field. The field name column provides a name of the depicted field. The current GDU column may provide a growing degree unit for the depicted crop. The harvest year column may provide a harvest year for the depicted crop. The tissue sample column may provide the number of tissues samples received for the depicted crop.

Figure 3:
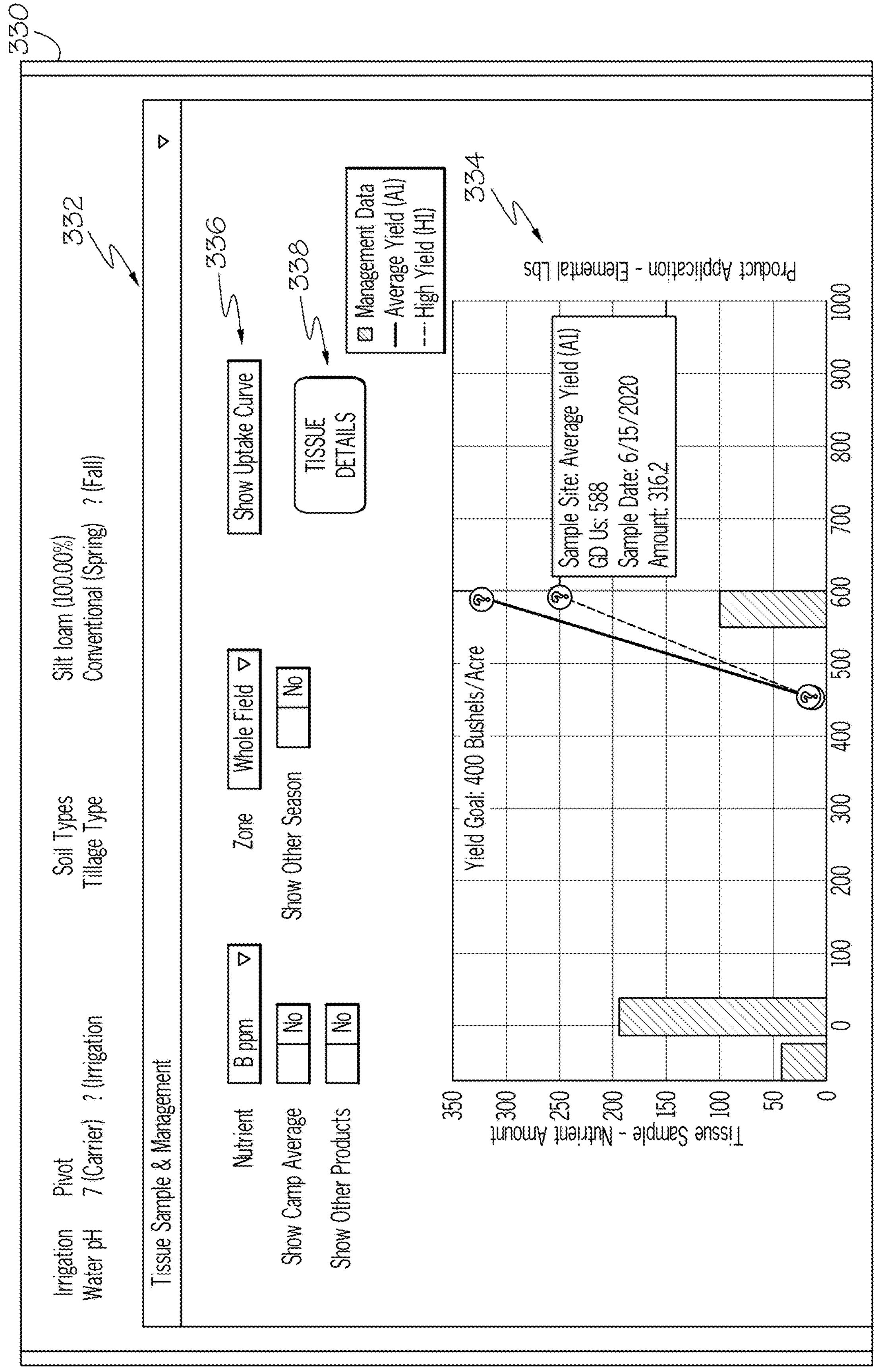
FIG. 3 depicts a user interface for providing tissue sample analysis, according to embodiments provided herein.

It should be understood that while embodiments described above indicate that a user manually inputs the desired information at the user computing device 102, some embodiments may be configured to receive at least a portion of the data from the remote computing device 104 from previously stored data. Similarly, some embodiments may be configured to receive the data from FIG. 3 depicts a user interface 330 for providing tissue sample analysis, according to embodiments provided herein. As illustrated, the user interface 330 provides a field portion 332 and a graphical representation 334 of yield goal versus nutrient amount in a tissue sample. The field portion 332 includes a nutrient option for illustrating characteristics of a nutrient, a camp average option for determining whether to show a camp average, an other products option for determining whether to illustrate other products, a zone option for determining which zone(s) to illustrate, and an other seasons option for determining whether to illustrated one or more seasons in the graphical representation 334. Also provided is an update curve option 336 for illustrating an update curve in the graphical representation 334. A tissue details option 338 is also provided. In response to selection of the tissue details option 338, additional details regarding one or more tissue samples may be provided.

The graphical representation 334 further depicts management data, average yield and high yield, based on the selections made in the field portion 332. In this particular example, there are two data points that indicate that there is a proportional relationship between increased nutrient amount and increased yield goal. However, it appears that large increases in nutrient amount results in a small increase in yield goal.

Figure 4:
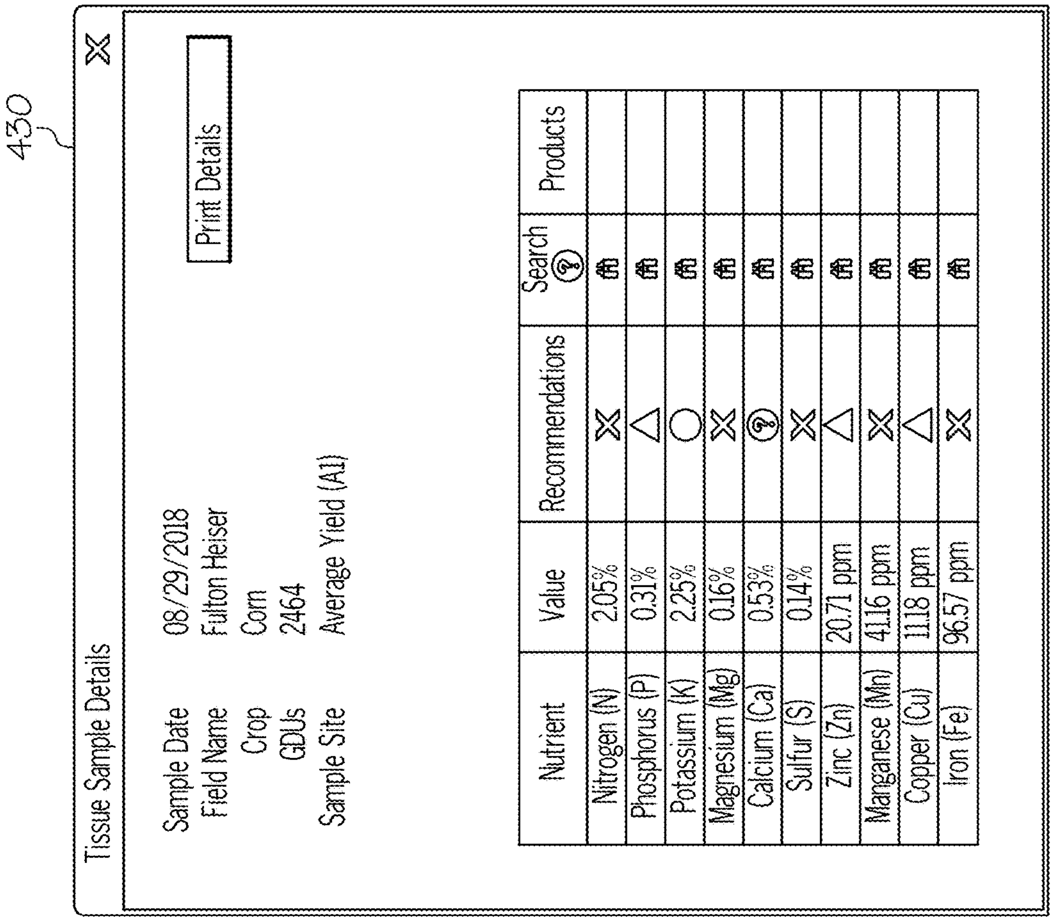
FIG. 4 depicts a user interface for providing tissue sample details, according to embodiments provided herein.

FIG. 4 depicts a user interface 430 for providing tissue sample details, according to embodiments provided herein. As illustrated, in response to selection of a tissue details option 338 from FIG. 3, the user interface 430 may be provided. As illustrated, the user interface 430 may provide a sample date, a field name, a crop type, GDUs, and a sample site. Also provided is a chart that provides nutrients in the sample, values for those nutrients, and whether the value corresponds with recommendations for that sample. Also provided are a search column, and a products column.

Specifically, the remote computing device 104 may be configured to determine recommendations for a particular field. The recommendations may be nutrient additives, water, etc. Accordingly, when the tissue sample is analyzed and compared to the recommendations, the recommendations column may depict compliance with the recommendations. If a recommendation is not met, a product may be provided in the products section for correcting the issue.

Figure 5A:
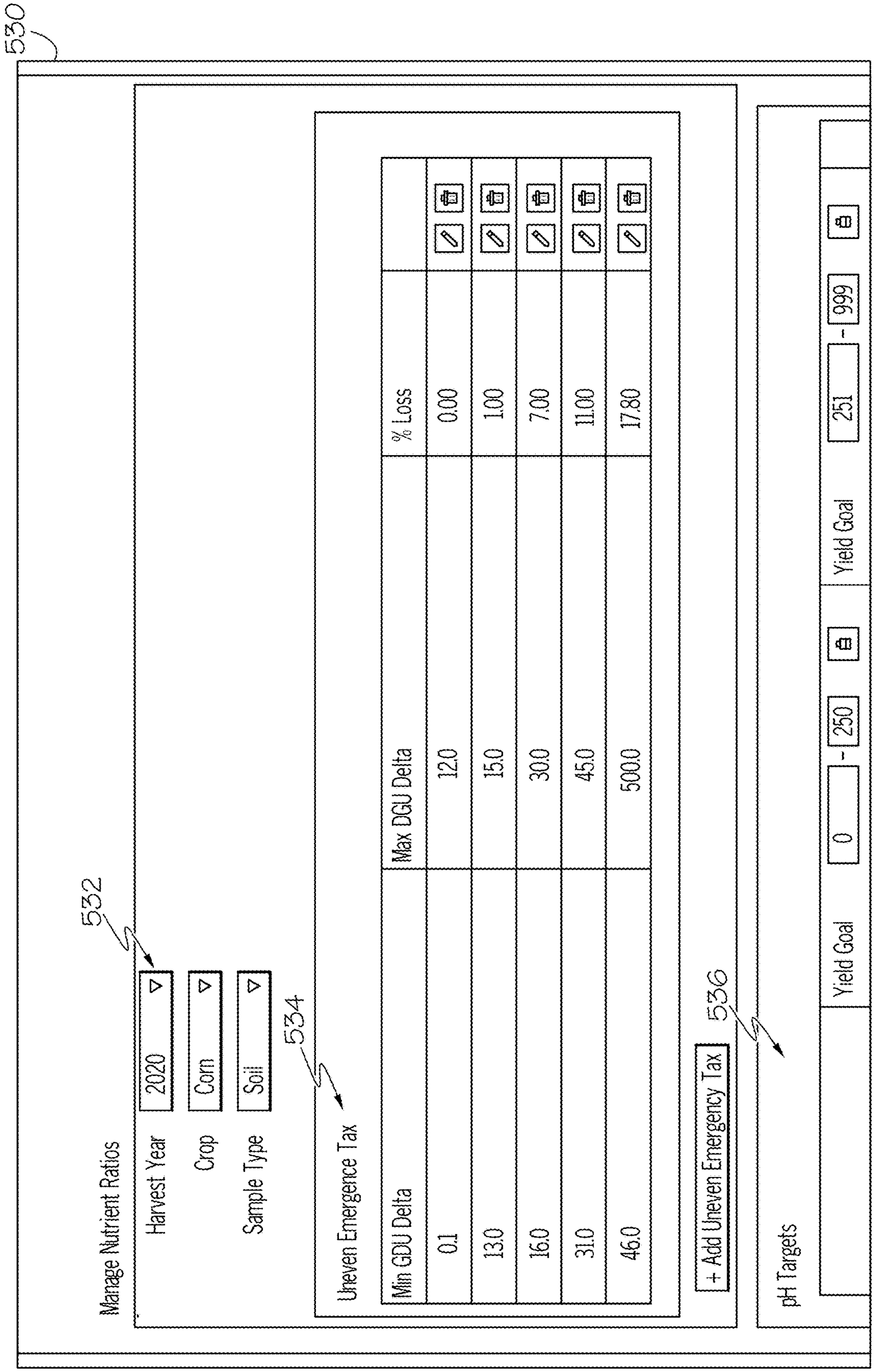
FIGS. 5A, 5B depict a user interface for managing nutrient ratios, according to embodiments provided herein, according to embodiments provided herein.
Figure 5B:
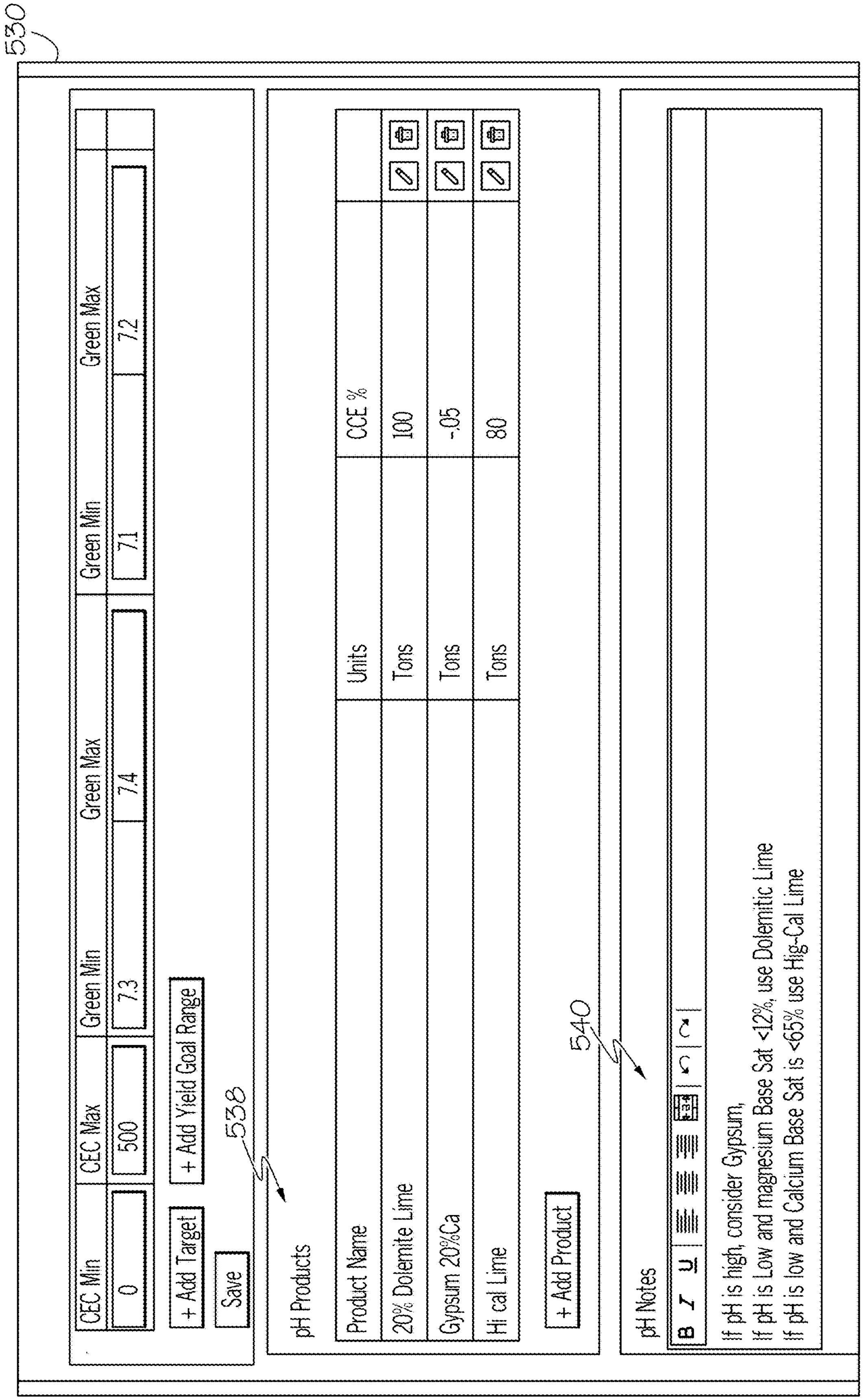

FIGS. 5A, 5B depict a user interface 530 for managing nutrient ratios, according to embodiments provided herein. As illustrated, the user interface 530 includes a fields section 532, an emergence tax section 534, and a pH targets section 536. The fields section 532 includes a harvest year option, a crop option, and a sample type option. These options may be selected by a user to determine the nutrient ratios that the user wishes to manage.

The emergence tax section 534 includes a minimum GDU delta column, a maximum GDU delta column, and a percentage loss column. As such, for each tissue sample, zone, crop, and/or field a minimum and maximum GDU delta may be determined. This determination may be from a use input, industry standards, and/or based on the crop and field characteristics for this crop. The pH targets section 536 may provide specified pH levels for one or more zones, based on various factors, including yield goal.

FIG. 5B is a continuation of the user interface 530 from FIG. 5A. As illustrated, the user interface 530 may also provide pH products section 538 may include a product name column, a units column, and a calcium carbonate equivalent (CCE) percentage column. A pH notes section 540 is also provided for a user to enter notes and/or comments related to the pH.

Figure 6:
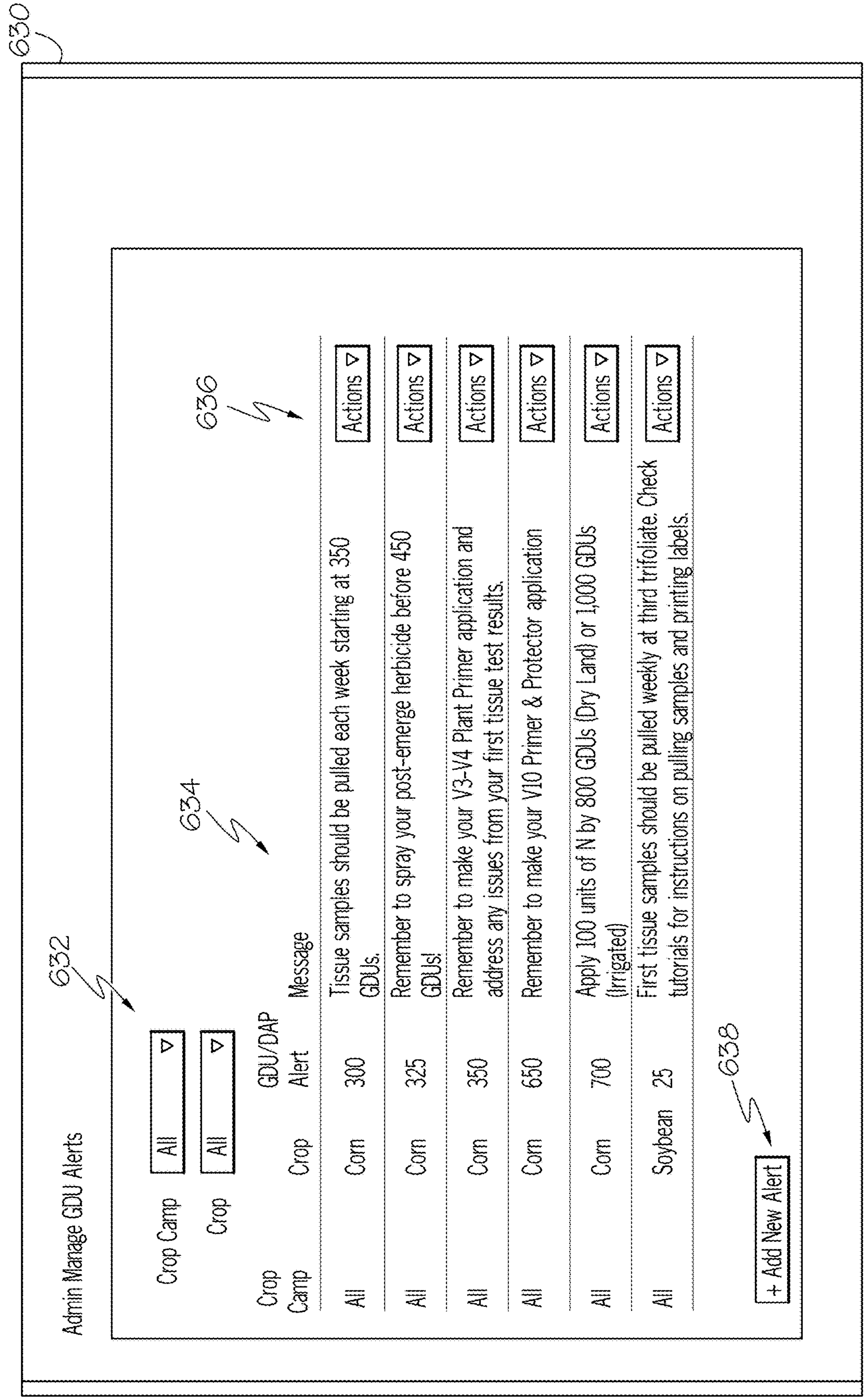
FIG. 6 depicts a user interface for managing GDU results, according to embodiments provided herein.

FIG. 6 depicts a user interface 630 for managing GDU results, according to embodiments provided herein. As illustrated, the user interface 630 may include an options section 632 and an alerts section 634. The options section may include a crop camp option and a crop option. The user may select either of these to determine which crop camp and crop to apply the alert. In the alerts section 634, a crop camp column, a crop column, a GDU/days after planting (DAP) alert, and message column are also provided. Also provided are action options 636. The action options may be selected by the user to determine the type of alert that will be provided.

Specifically, the user may select an add new alert option 638. In response, the user may be provided with options to define one or more of the columns in the alerts section 634. Once the created alert is provided in the alerts section 634, the user may determine which type of alert is provided in response to the criteria of that alert being realized.

Figure 7:
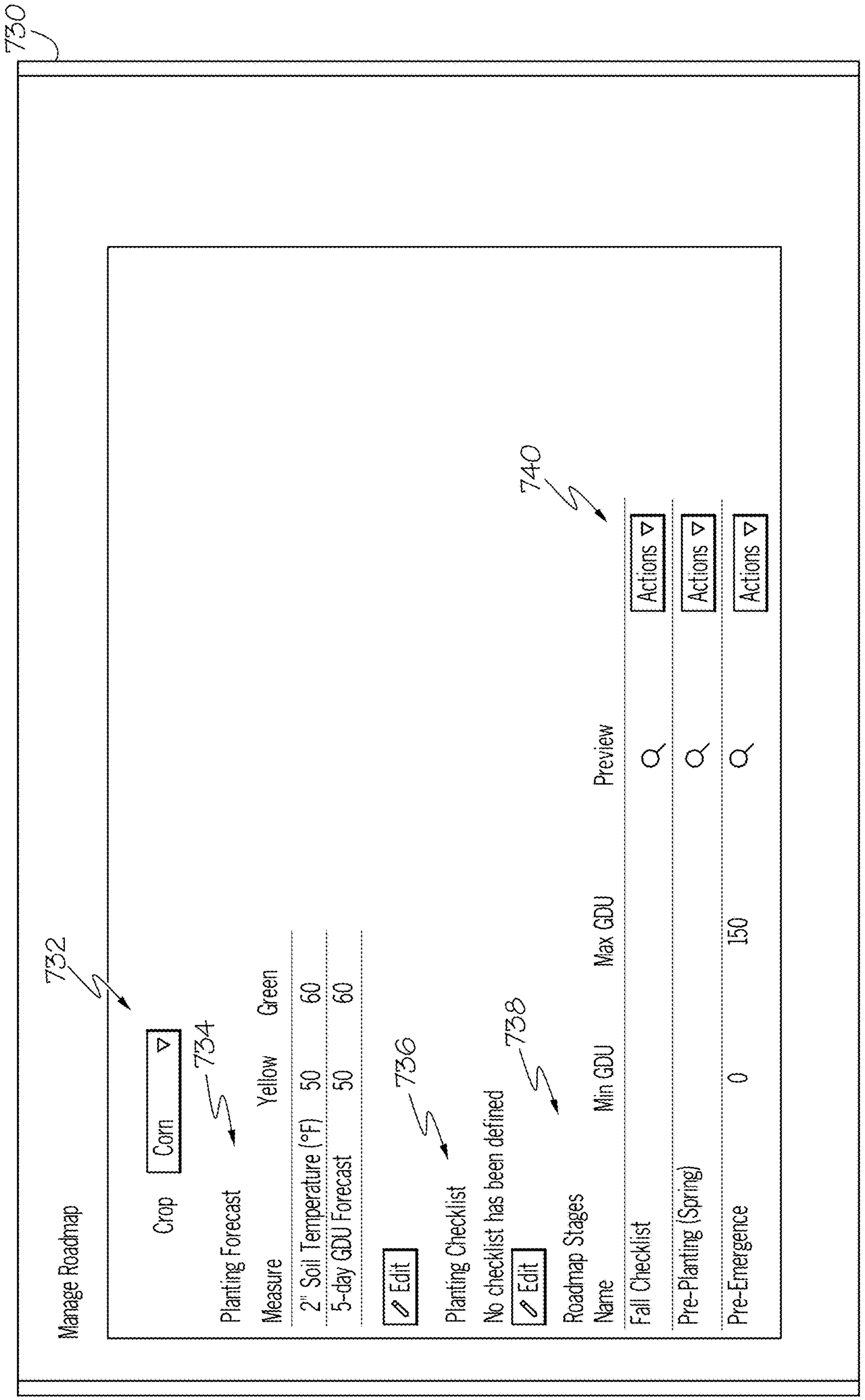
FIG. 7 depicts a user interface for managing a roadmap, according to embodiments provided herein.

FIG. 7 depicts a user interface 730 for managing a roadmap, according to embodiments provided herein. As illustrated, the user interface 730 includes a crop section 732, a planting forecast section 734, a planting checklist 736, and a roadmap stages section 738. In the crop section 732, the user may identify which crop to select. In the planting forecast section 734, a measure column, a yellow column, and a green column may be provided. In the planting checklist 736, the user may provide one or more action items for planting. The roadmap stages section 738 includes a name column, a minimum GDU column, a maximum GDU column, and a preview column. Also provided are action options 740. Depending on the particular embodiment, the roadmap stages may be user defined and/or provided by the remote computing device 104 based on information related to the particular crop, field, zone, etc. The user may select one or more of the action options 740 to determine alerts and/or other actions that may be provided to the user associated with that stage.

Figure 8:
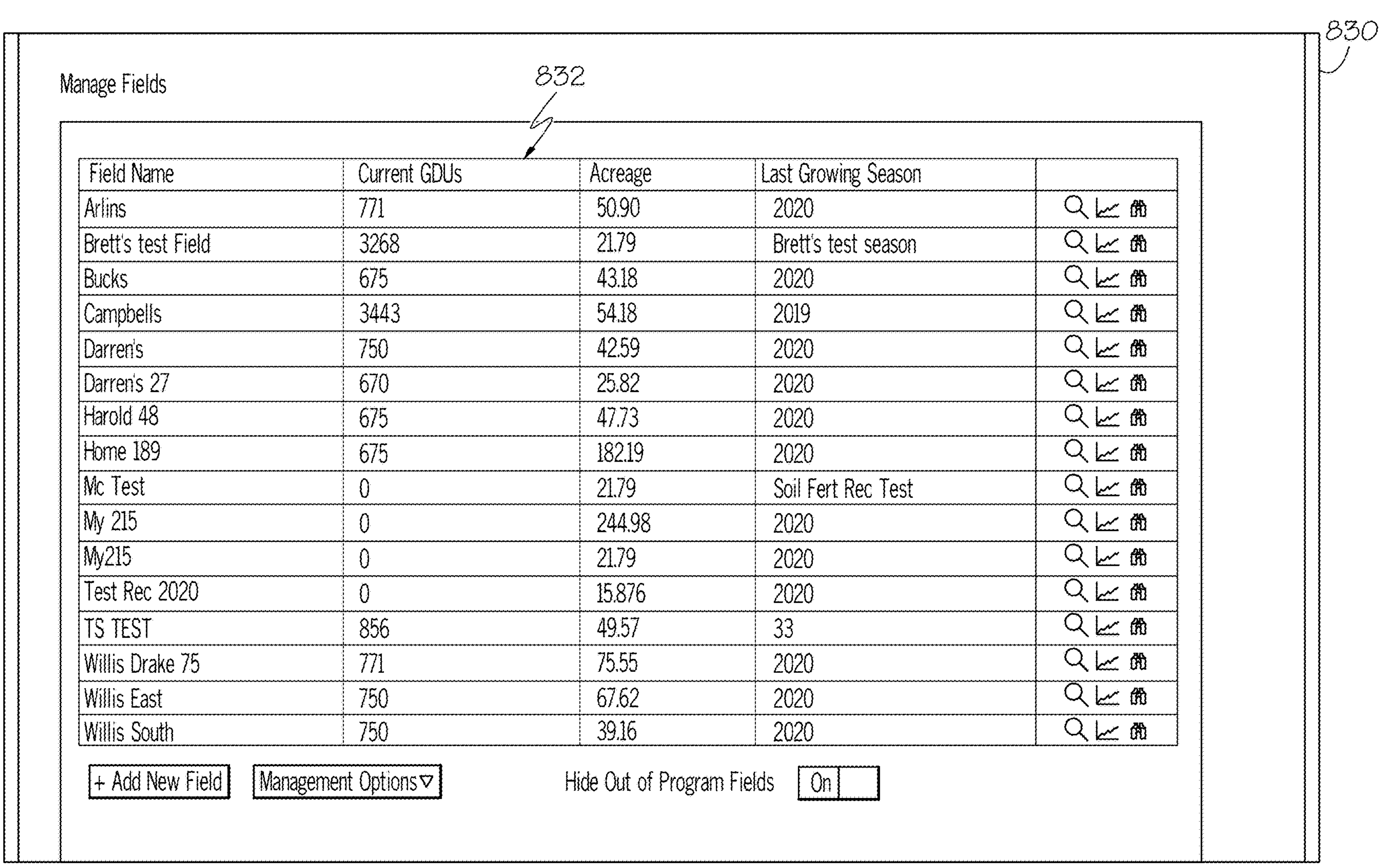
FIG. 8 depicts a user interface for managing fields, according to embodiments provided herein.

FIG. 8 depicts a user interface 830 for managing fields, according to embodiments provided herein. As illustrated, the user interface 830 includes a management section 832 that includes a field name column, a current GDUs column, an acreage column, and a last growing season column. Also provided are options for searching, graphic, and viewing the roadmap, such as provided in the user interface 730.

Figure 9A:
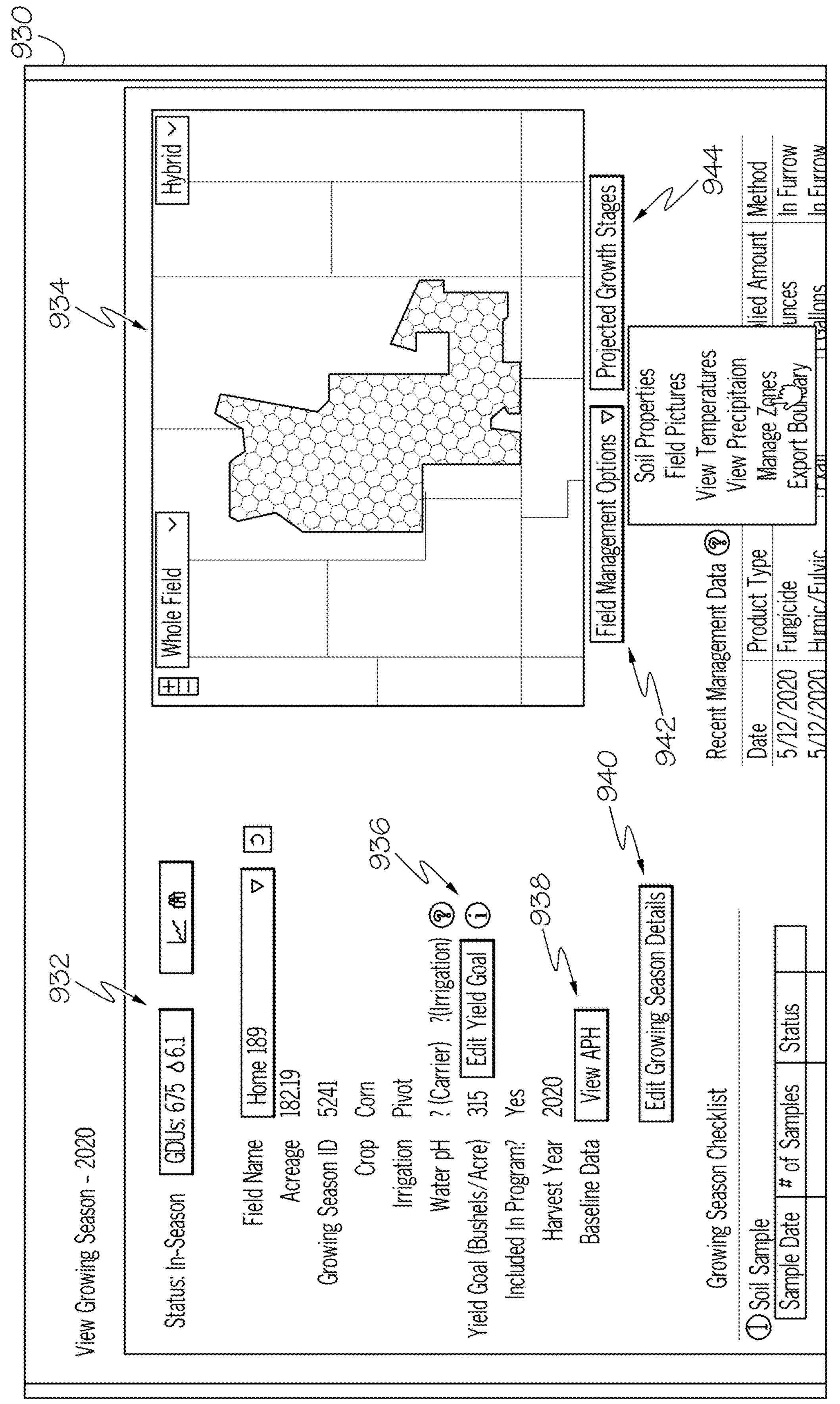
FIG. 9A, 9B depict a user interface for providing crop management for a field, according to embodiments provided herein.
Figure 9B:
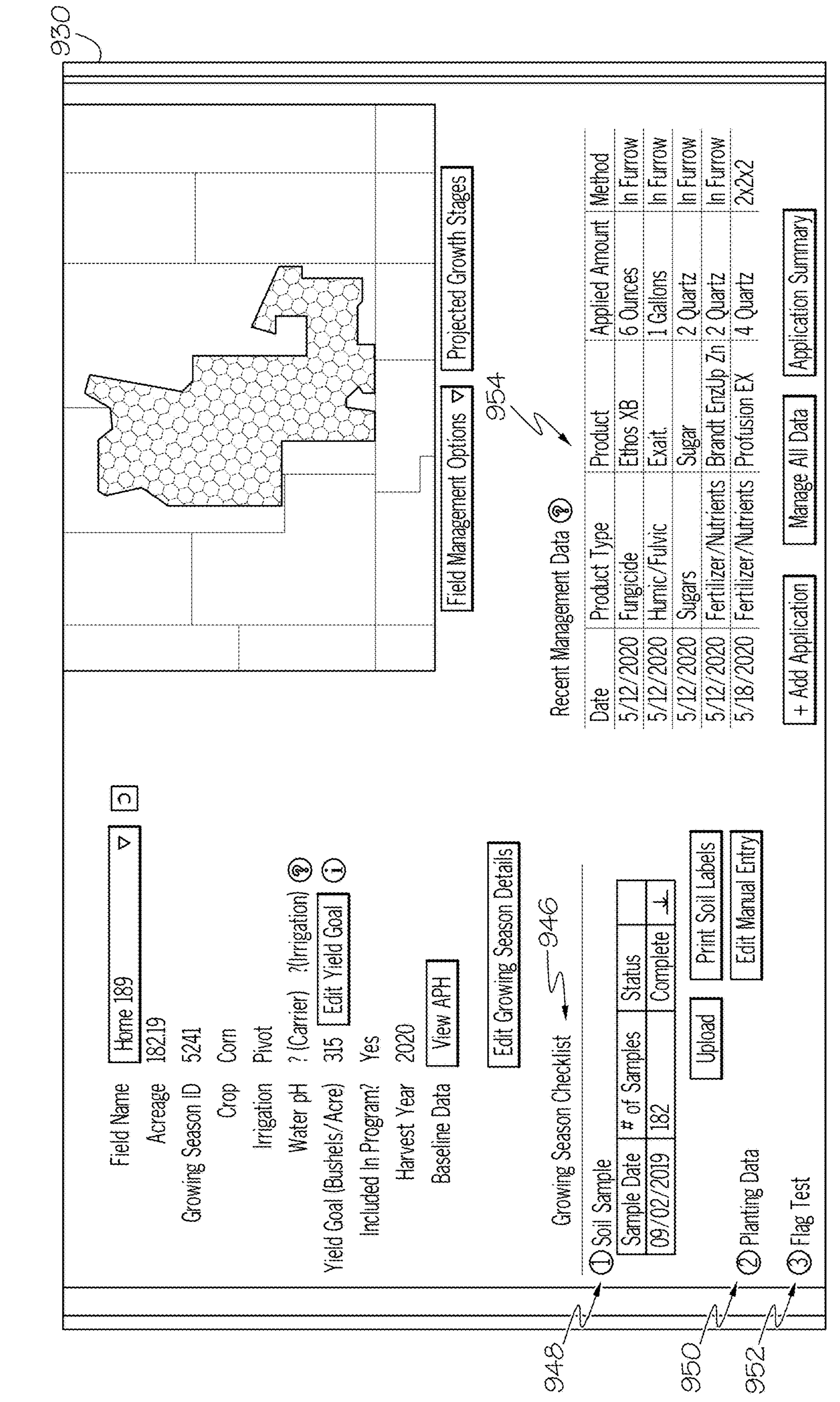

FIG. 9A, 9B depict a user interface 930 for providing crop management for a field, according to embodiments provided herein. As illustrated in FIG. 9A, the user interface 930 may include a data section 932 and a map section 934. The data section 932 in FIG includes a field name option for identifying the field for analysis. The acreage, growing season identifier, crop, irrigation, and water pH for the selected field may also be provided. Additionally, a yield goal for the crop may be provided, as well as an edit yield goal option 936 for the user to edit the yield goal. Actual production history (APH) may be viewed in response to selection of a view APH option 938. An edit growing season details option 940 may be provided for editing details of the growing season.

In the map section 934, an overhead view of the field may be provided, as well as indicators for zones, crops, plants, water applications, nutrient applications, etc. The map section 934 may also include a field management option 942 and a projected growth stages option 944. In response to selection of the field management option 942, additional options for managing the field may be provided, such as editing soil properties, viewing field pictures, viewing temperatures, viewing precipitation, managing zones, and exporting a boundary. In response to selection of the projected growth stages option 944, the remote computing device 104 may predict grows stages of the crop, based on climate, weather, soil, and agricultural practices.

FIG. 9B is a continuation of the user interface 930. Accordingly, the user interface 930 further includes a growing season checklist section 946 and a recent management data section 954 that lists a date, product type, product, applied amount, and method. The growing season checklist section 946 includes a soil sample section 948, which provides a listing of soil samples (and thus soil sample data) taken in the field. A planting data section 950 is provided which lists data related to plantings made on this field, such as date, type of seed, fertilizer, method of planting, etc. Also included in the growing season checklist section 946 is a flag test section 952. The flag test section 952 may provide results of any flag tests performed on the field.

Specifically, embodiments provided herein may be configured to perform a flag test on a crop. A flag test includes monitoring growth of a crop at regular intervals to determine how uniform the growth of a crop is. This measurement includes determining a growth snapshot at a first time interval (e.g. 1, 2, 3, 4, 5, 6, 7, 8, 9, 10, 11, 12, 13, . . . hours) and determining a percentage of plants that have grown to a predetermined level. Another growth snapshot is captured at a second time interval and determination is performed regarding the number of new plants that have reached the predetermined level. A calculation is performed regarding the number of GDUs the newly grown plants have received since the first growth snapshot. If the number of GDUs is below a first threshold, the newly grown plants will be grouped with the originally grown plants. If the newly grown plants have absorbed a predetermined amount of GDUs (e.g., 12), the newly grown plants will be assigned a emergence tax, which represents a presumed decrease in plant output from the originally grown plants. This process continues until a predetermined number of growth levels have been computed, each with an increasing emergence tax, representing a decrease in plant output at subsequent levels. With this information, embodiments provided herein predict and report a percentage in expected yield, which is then communicated to the grower. This reduction in expected yield may then be utilized to affect the yield goal going forward. Additionally, embodiments may be configured to predict, moving forward, problems that cause the emergence tax and address those problems with the grower when beginning to plant the next crop. As an example, if the remote computing device 104 determines that the primary problem occurs during germination, it may be determined that the soil preparation or seeding may be the primary problem and solutions for solving that problem may be recommended to the grower.

Figure 10:
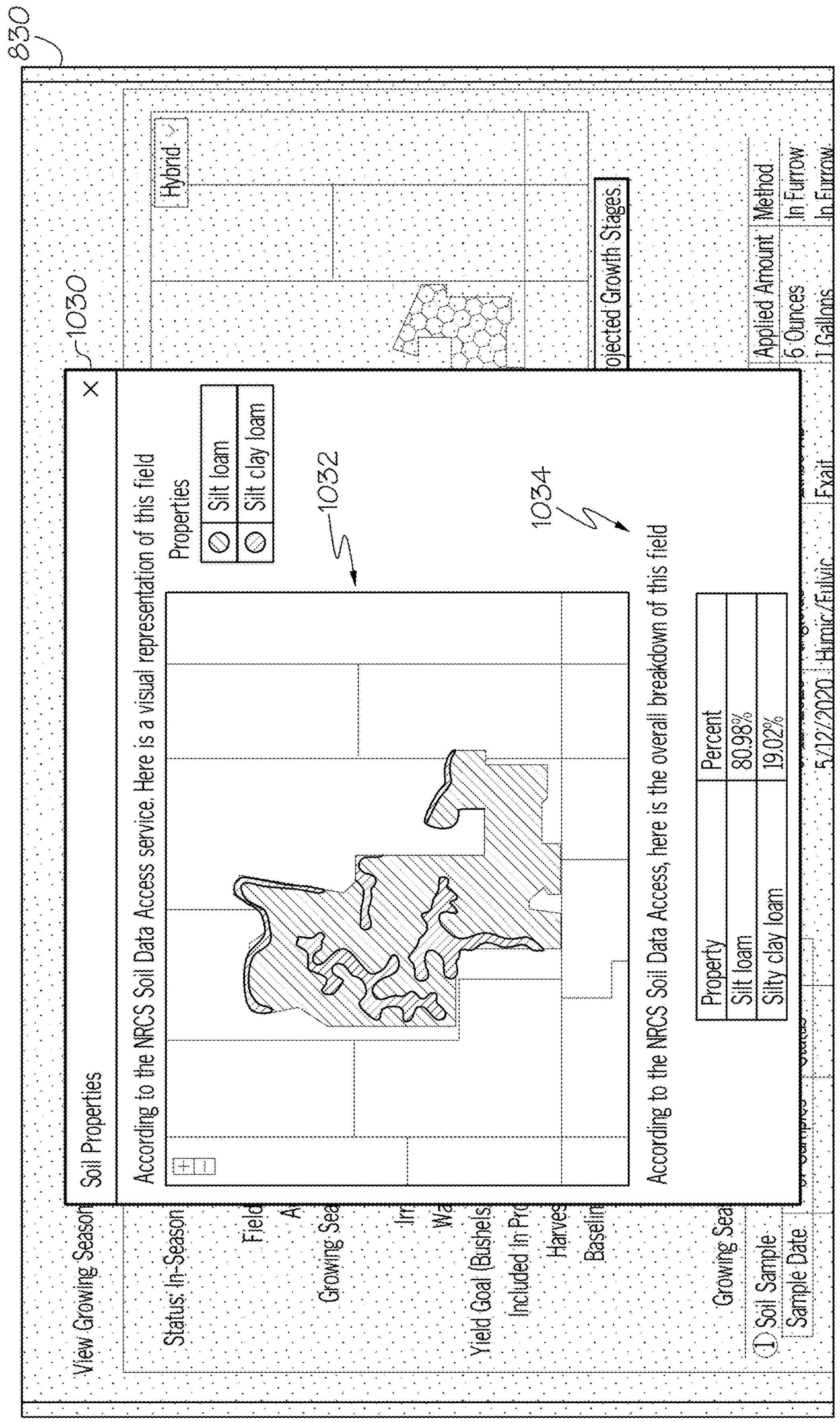
FIG. 10 depicts a user interface for providing properties of a field, according to embodiments provided herein.

FIG. 10 depicts a user interface 1030 for providing properties of a field, according to embodiments provided herein. In response to selection of the soil properties suboption in the field management option 942 (FIG. 9A), a map 1032 may be provided that depicts properties of a field, such as silt loam and silty clay loam. A properties section 1034 may provide a numerical breakdown of the properties depicted in the map 1032. Other properties of the field may be provided, such as moisture content, nutrient composition, etc.

Figure 11:
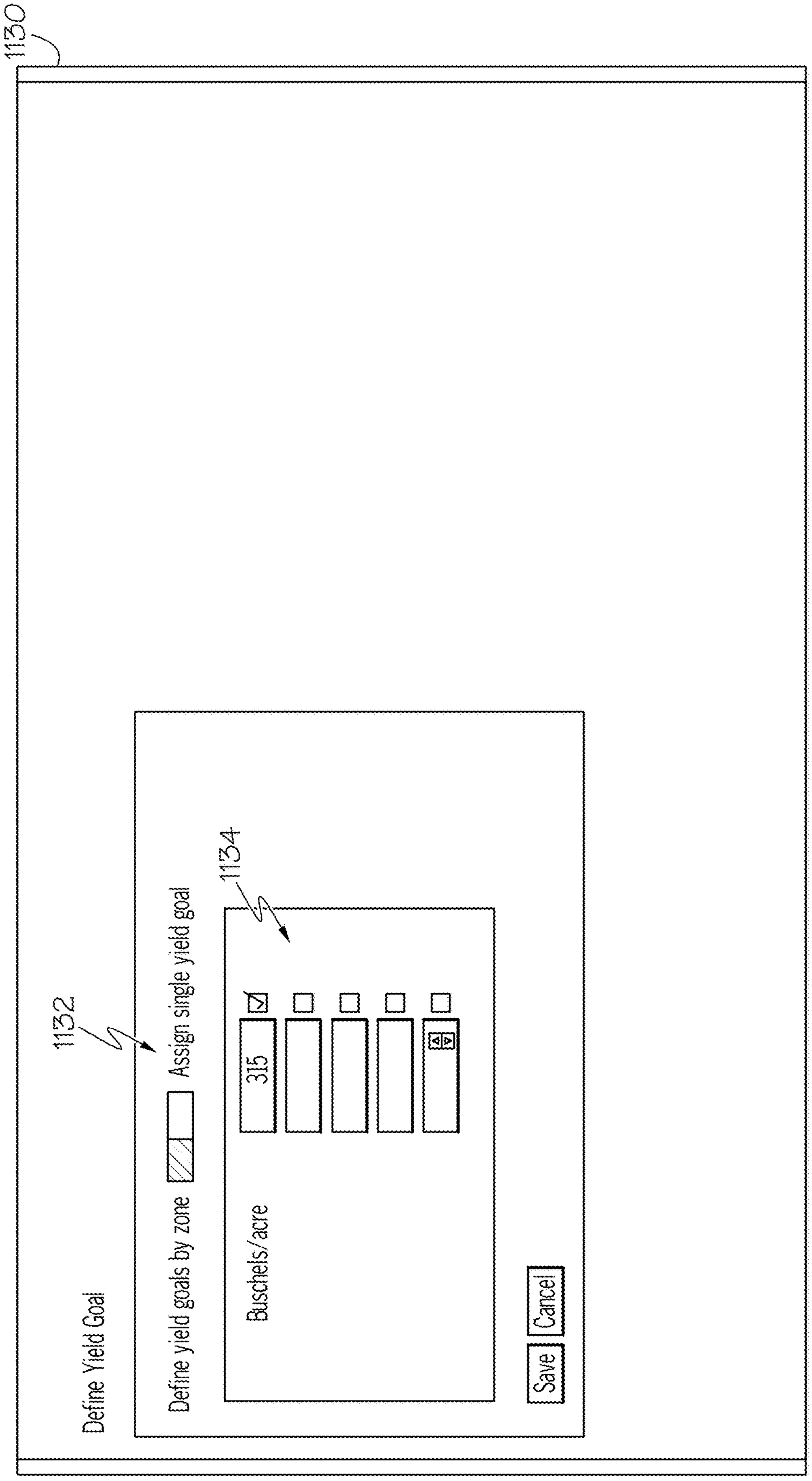
FIG. 11 depicts a user interface for defining a yield goal, according to embodiments provided herein.

FIG. 11 depicts a user interface 1130 for defining a yield goal, according to embodiments provided herein. In response to selection of the define yield goal option 936 from FIG. 9A, the user interface 1130 may be provided. As illustrated, the user interface 1130 includes a define option 1132 and a goal section 1134. The define option 1132 provides the ability for the user to define yield goals by zone or to assign a single yield goal for a field options for defining a bushels per acre yield goal is provided. The goal section 1134 includes field for the user to provide the desired bushels per acre goal for the respective crop.

Figure 12:
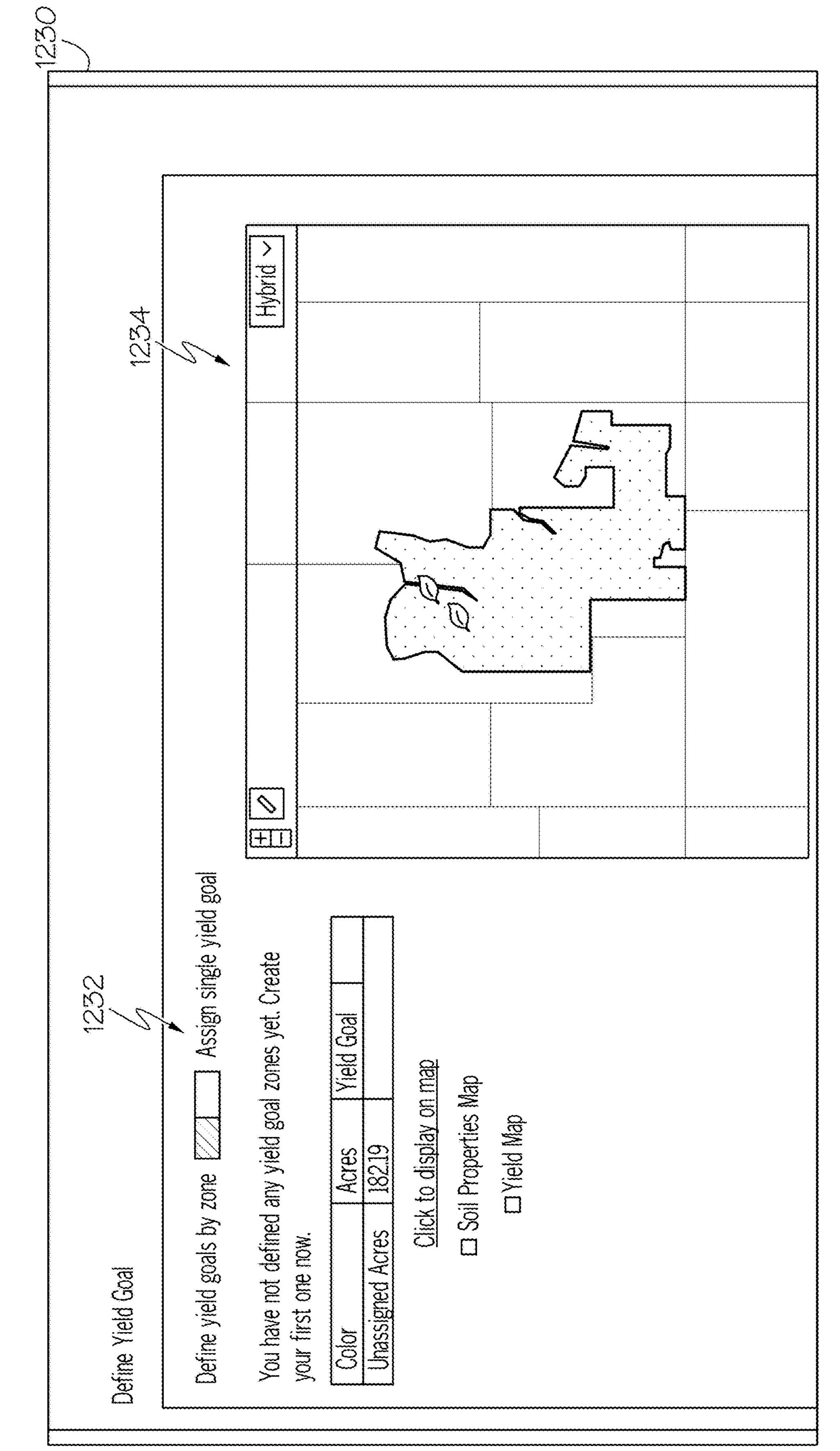
FIG. 12 depicts another user interface for defining a yield goal, according to embodiments provided herein.

FIG. 12 depicts another user interface 1230 for defining a yield goal, according to embodiments provided herein. In response to selection of the define option 1132 from FIG. 11, the user interface 1230 may be provided (as an alternative to the user interface 1130). As illustrated, the user interface 1230 provides a define option 1232 to define a yield goal by zone or a single yield goal. Also provided is a map section 1234, which provides the field and yield goal.

Figure 13:
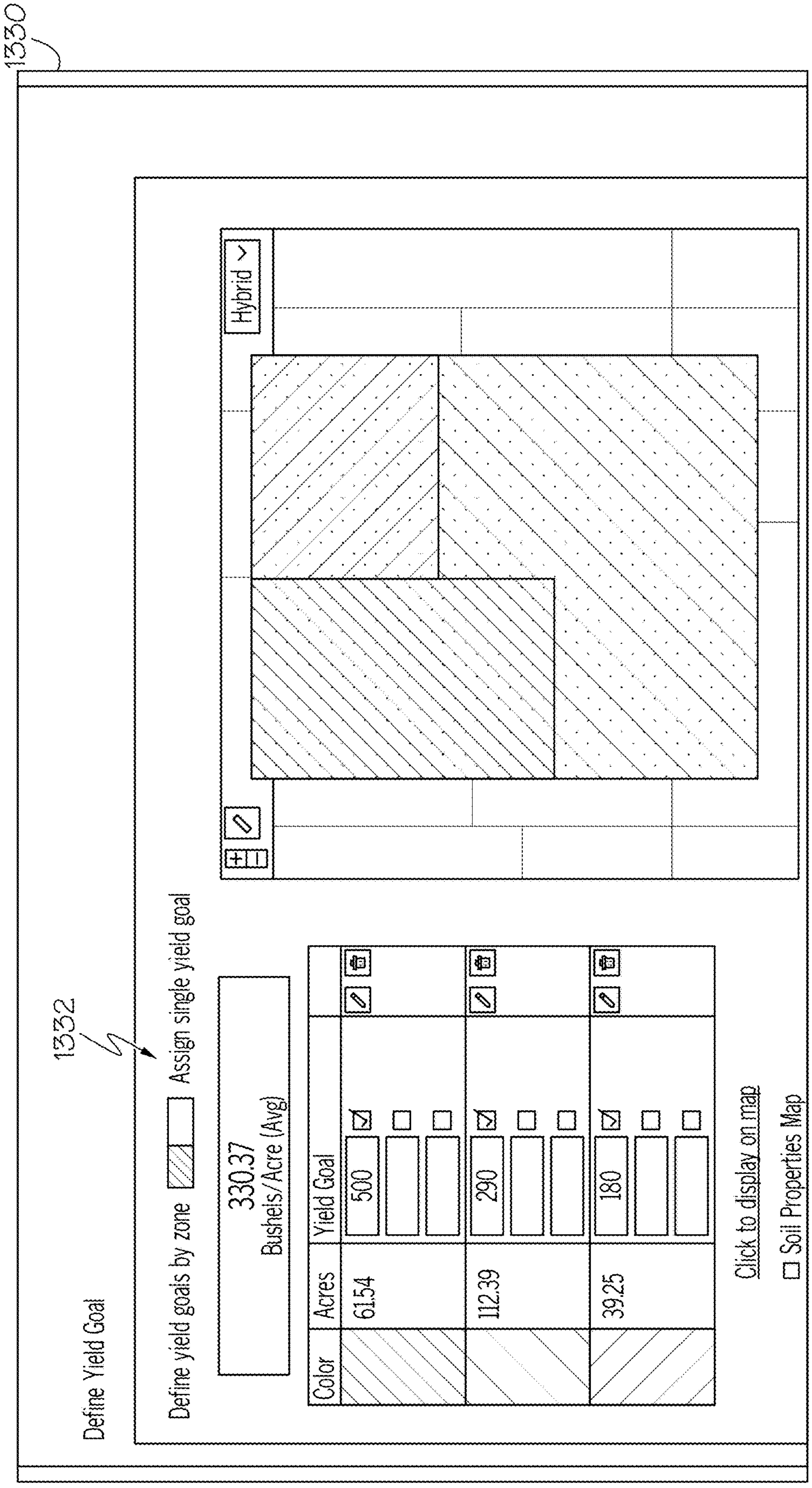
FIG. 13 depicts a user interface for editing a yield goal, according to embodiments provided herein.

FIG. 13 depicts a user interface 1330 for editing a yield goal, according to embodiments provided herein. In response to selection of the edit yield goal option 936 from FIG. 9A, the user interface 1330 may be provided. As illustrated, fields for editing the yield goal by zone are provided. An image of the field and zones may also be provided, as well as a yield goal option 1332 for a user to determine whether the yield goals will be defined by zone or whether one yield goal will be defined for the entire area.

Figure 14:
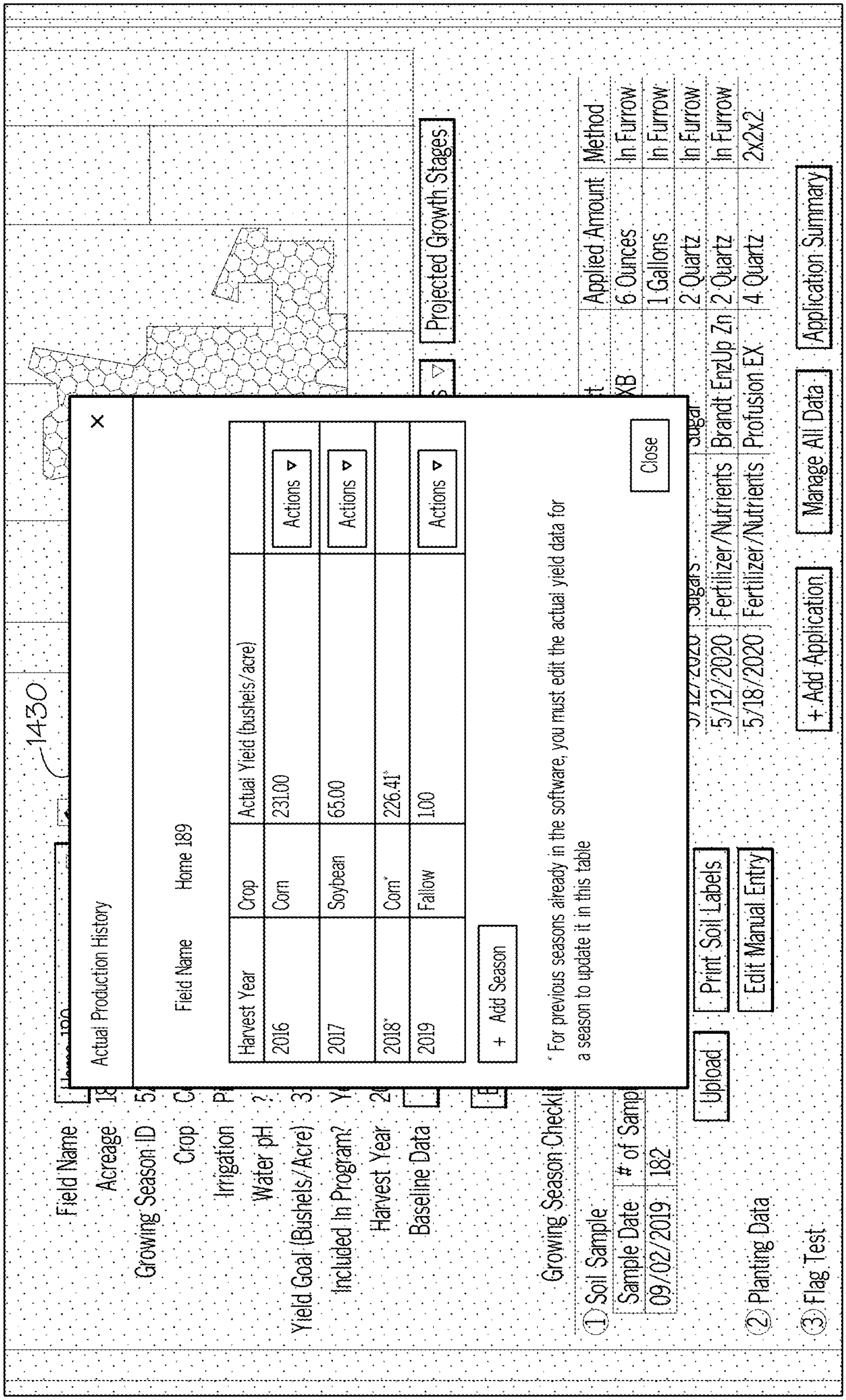
FIG. 14 depicts a user interface for providing production history of a field, according to embodiments provided herein.

FIG. 14 depicts a user interface 1430 for providing production history of a field, according to embodiments provided herein. In response to selection of the view APH option 938 from FIG. 9A, the user interface 1430 may be provided. As illustrated, fields for harvest year, crop, and actual yield are provided for those harvest years and crops. Also provided are one or more options for performing actions on the data.

Figure 15A:
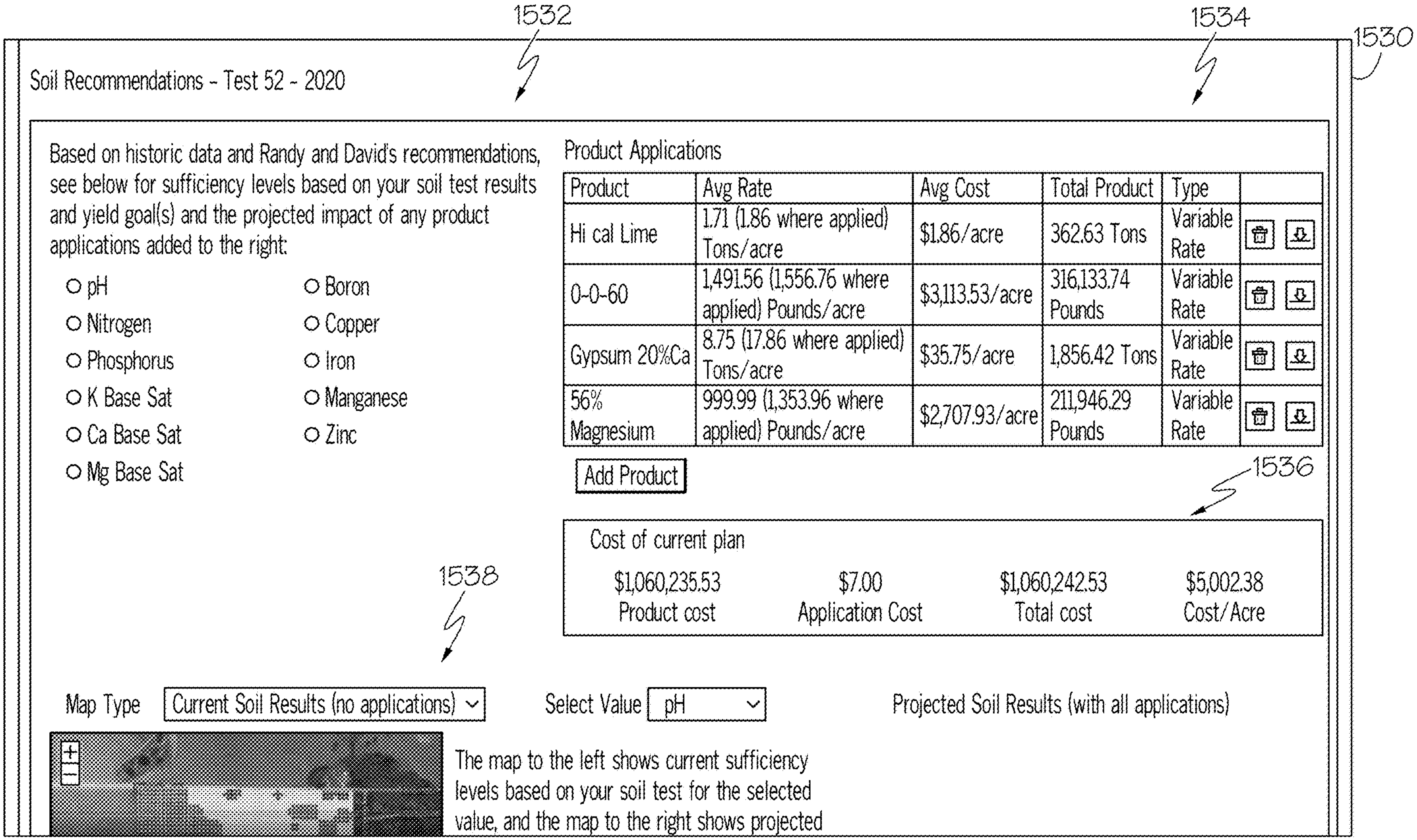
FIGS. 15A-15C depict a user interface for providing a soil recommendation, according to embodiments provided herein.
Figure 15B:
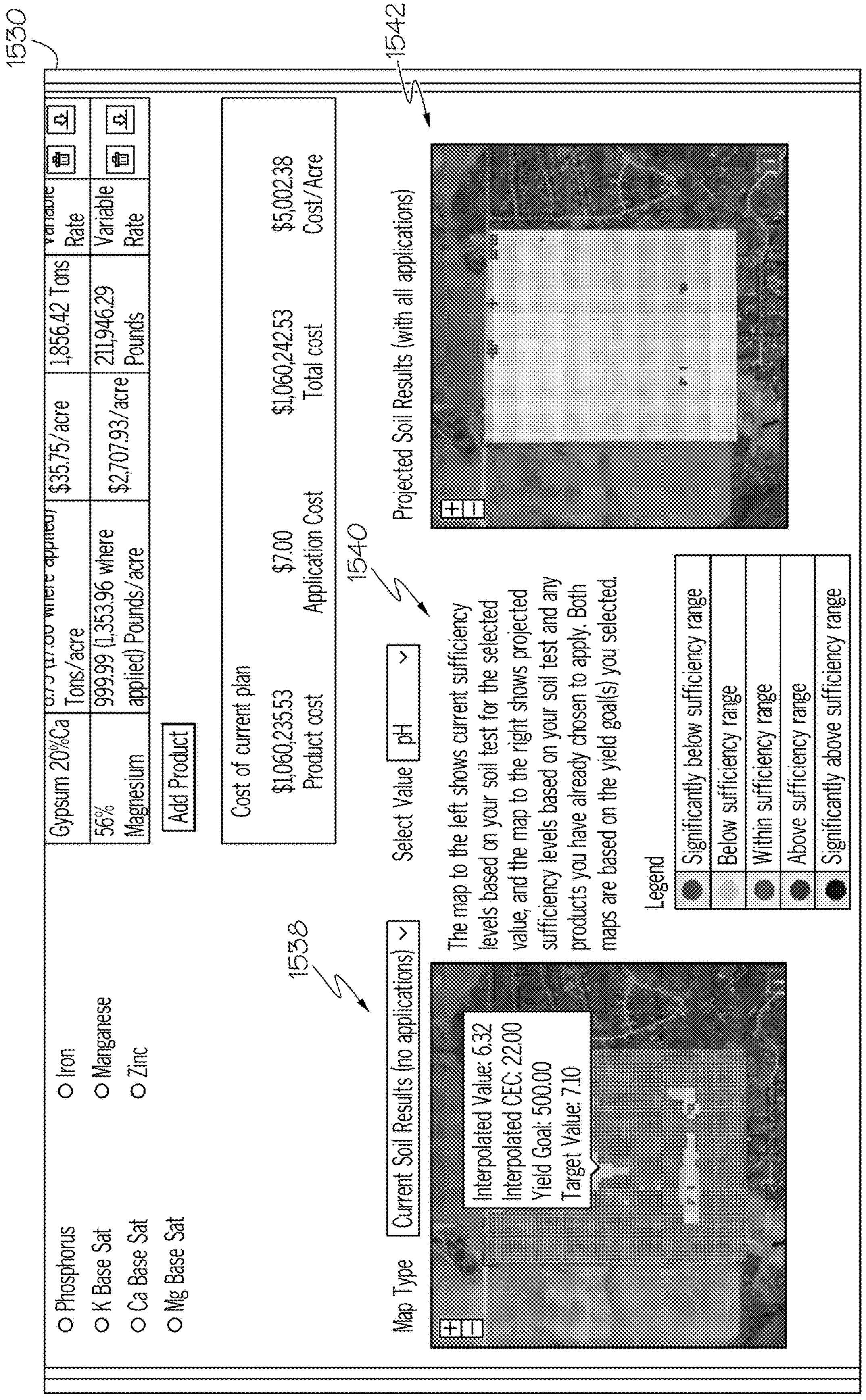
Figure 15C:
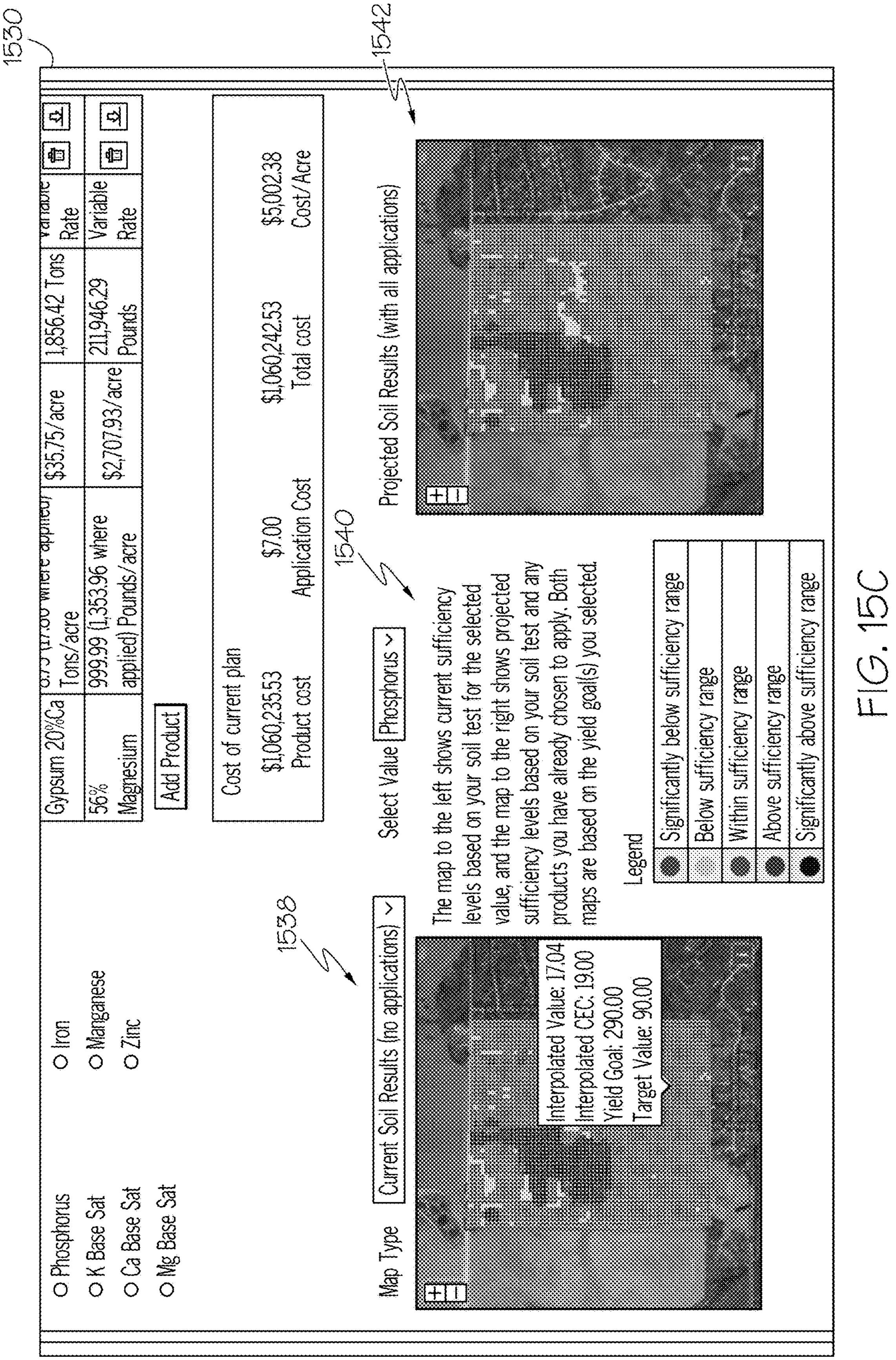

FIGS. 15A-15C depict a user interface 1530 interface for providing a soil recommendation, according to embodiments provided herein. As illustrated in FIG. 15A, recommendations for sufficiency levels based on soil test results and yield goals, as well as the project impact of product applications are provided. As such, the user interface 1530 includes a product section 1532, a product application section 1534, a current plan section 1536, and a map section 1538.

The product section 1532 provides a listing of sufficiency levels for a crop and/or field, which is predicted to have a positive effect on the yield of a crop. Examples of the categories for which sufficiency levels may be provided include pH, nitrogen, phosphorous, potassium based saturation, calcium based saturation, magnesium based saturation, boron, copper, iron, manganese, and zinc. Depending on the embodiment, the category listings may be color-coded based on the current sufficiency. Other categories may also be provided.

The product application section 1534 includes a product column, a rate column, a cost column, a total product column, and a type column. The product column may provide a product or product type that have been recommended for increasing the yield to the yield goal. The listed products may be determined based on an analysis of the remote computing device 104, which may access past results for the present crop, field, and/or related crops or fields, as well as case studies, manufacturer recommendations, etc. The rate column may provide a recommended rate of application for the recommended product. The cost column may provide a cost of the product per acre, based on the recommended rate. The total product column represents a calculation of the rate of product multiplied by the acreage of application. The type column references a rate type for the product.

In the cost of current plan section 1536, a product cost, application cost, total cost, and per acre cost are provided. Specifically, the current plan section 1536 provides the cumulative cost of the product applications from the product application section 1534. The map section 1538 provides a graphical depiction of the projected soil results with the applications. As illustrated more clearly in FIGS. 15B and 15C, the user interface 1530 further includes a select value section 1540 and a projected map section 1542. Specifically, the map section 1538 provides an option for selecting the map type. In some embodiments, the map section 1538 may provide the map of the field (or zone) with no applications or with the current sufficiency levels based on a previously performed soil test. The map section 1538 may depict yield, growth, output, and/or any of the categories provided in the product section 1532. The select value section 1540 may provide a user option to select which of the categories of results are provided in the map section 1538 and the projected map section 1542. The select value section 1540 also provides a key for the depicted colors in the map section 1538 and the projected map section 1542. The projected map section 1542 provides the projected soil results with the recommended products and applications from the product application section 1534.

Figure 16A:
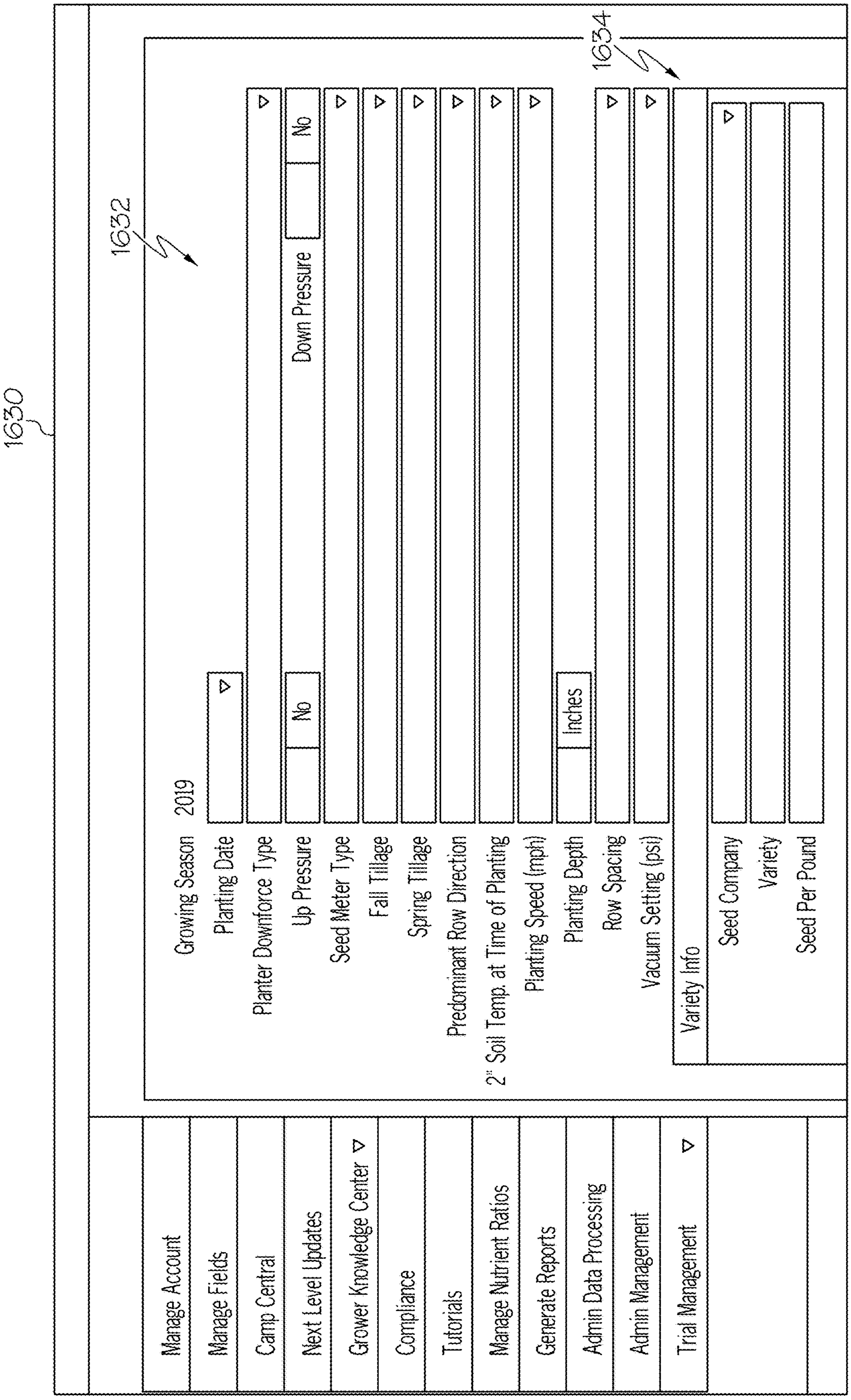
FIGS. 16A, 16B depict a user interface for providing crop management, according to embodiments provided herein.
Figure 16B:
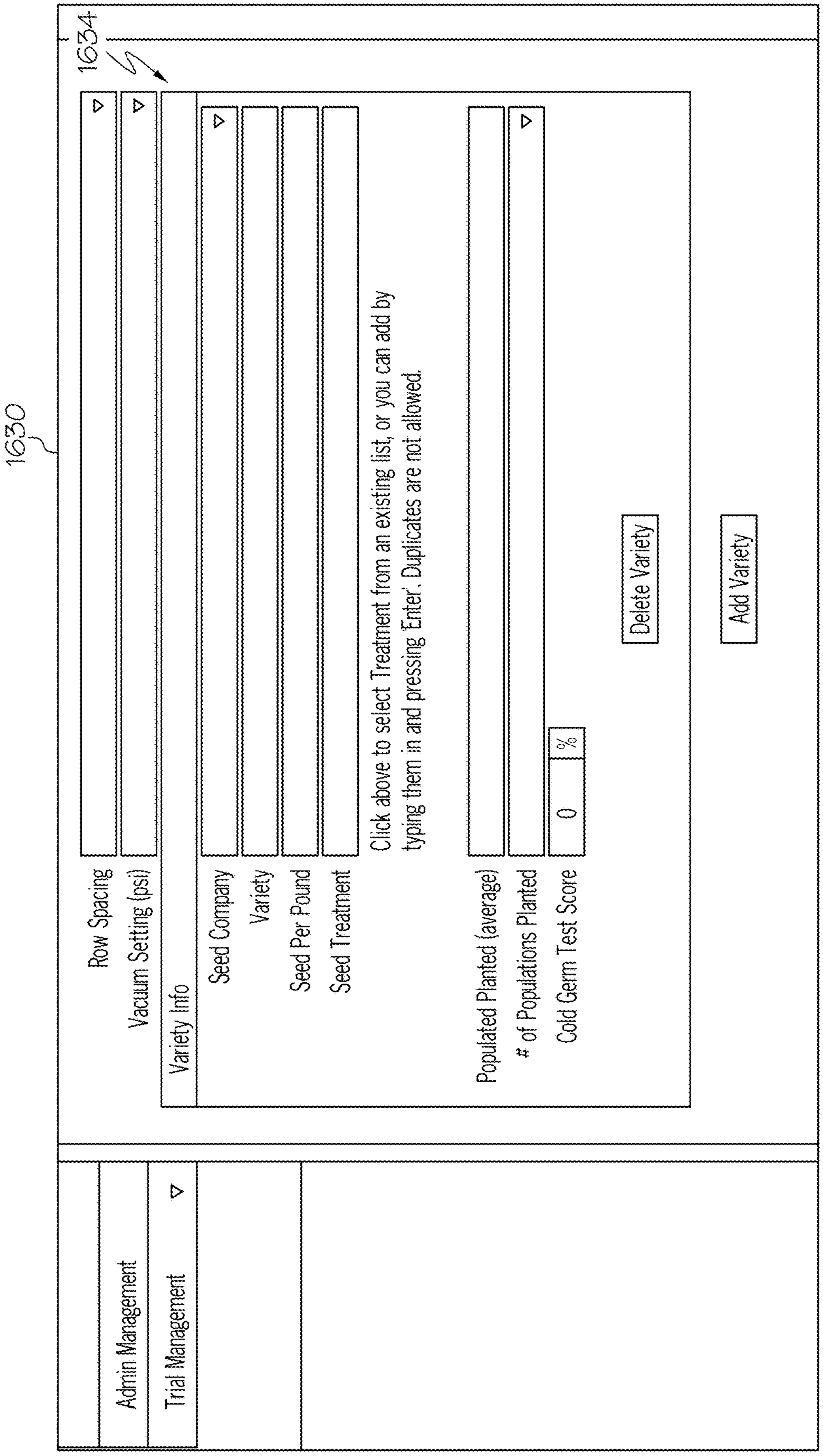

FIGS. 16A, 16B depict a user interface 1630 for providing crop management, according to embodiments provided herein. As illustrated in FIG. 16A, the user interface 1630 includes a planting section 1632 and a variety section 1634. The planting section 1632 includes a growing season field, a planting date field, a planter downforce type field, an up pressure field, a down pressure field, a seed meter type field, a fall tillage field, a spring tillage field, a predominant row direction field, a two inch soil temp field, a planting speed field, a planting depth field, a row spacing field, and a vacuum setting field. As also illustrated in FIG. 16A and continued in FIG. 16B, the variety section 1634 includes a seed company field, a variety field, a seed per pound field, a seed treatment field, a population planted field, a number of populations planted field, and a cold germ test score field.

Figure 17:
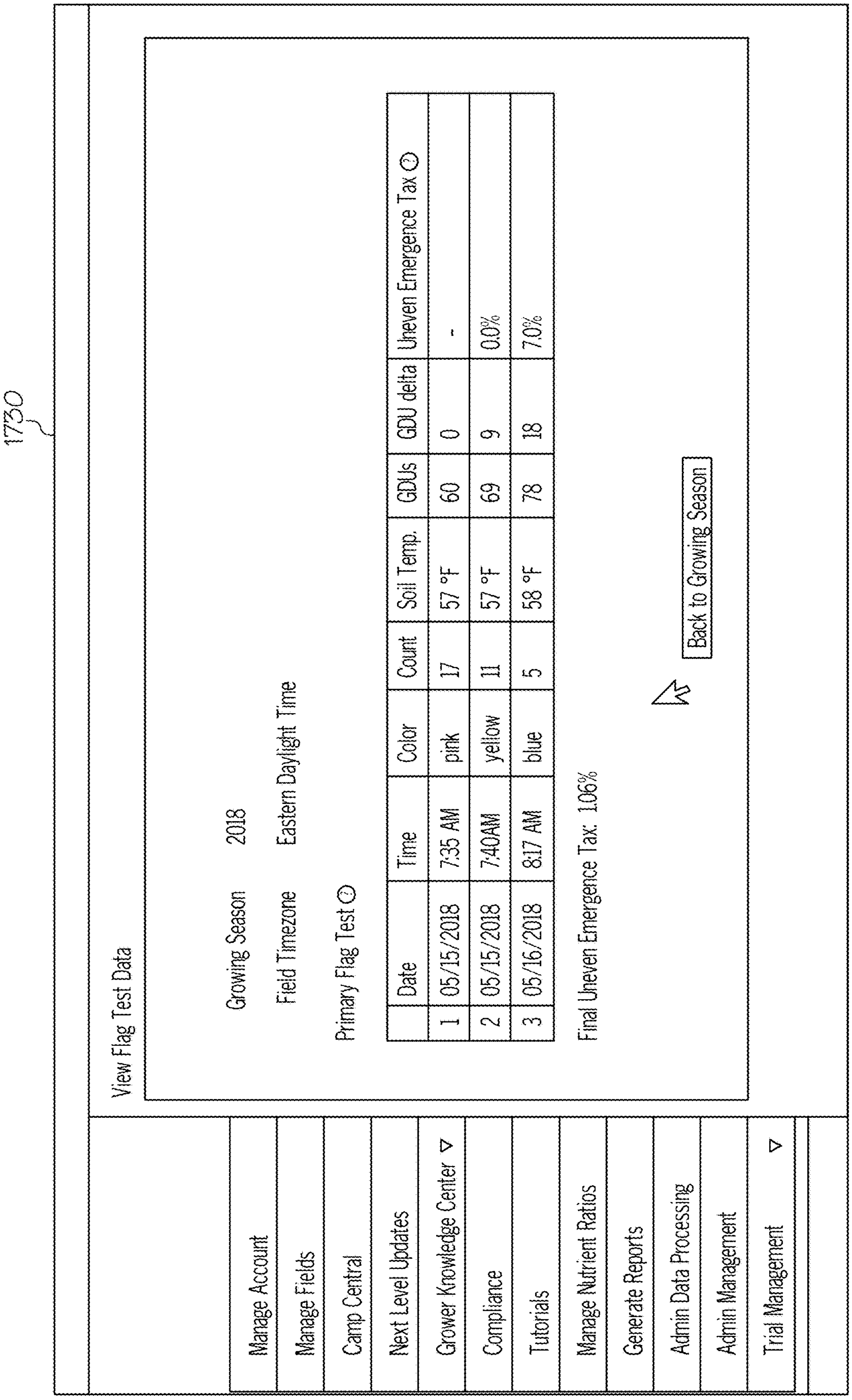
FIG. 17 depicts a user interface for providing flag test data, according to embodiments provided herein.

FIG. 17 depicts a user interface 1730 for providing flag test data, according to embodiments provided herein. As illustrated, the user interface 1730 provides results for a primary flag test, which include columns for date, time, color, count, soil temperature, GDUs, GDU delta, and uneven emergence tax. A value for final uneven emergence tax may also be provided.

Specifically, the user interface 1730 illustrates that a first growth snapshot was taken at 7:35 AM and in that growth snapshot, 17 plants had sprouted. The soil temperature was 57 degrees, so the baseline GDUs were 60. A second growth snapshot was taken at 7:40 PM and in that growth snapshot, an additional 11 plants had sprouted. The soil temperature remained unchanged, so based on the time period between growth snapshots, the plants had received an extra 9 GDUs. If the threshold GDUs per level is 12, these two snapshots would be treated equally for predicting the emergence tax. A third growth snapshot was taken at 8:17 AM the following day. In that growth snapshot, an additional 5 plants had sprouted. The soil temperature had risen one degree, so based on the time, the change in GDUs was 18 from the first growth snapshot. Because of this, these 5 plants would be subject to an emergence tax of 7%. This means that embodiments provided herein predict that these 5 plants will yield 7% less plant output than the first 21 plants that spouted. The final emergence tax in this example is 1.06%. This information may be utilized to reduce yield goal or to instruct the grower that a determined yield goal may not be attainable and thus may recommend not investing additional resources to try to increase crop output beyond this new threshold.

Figure 18:
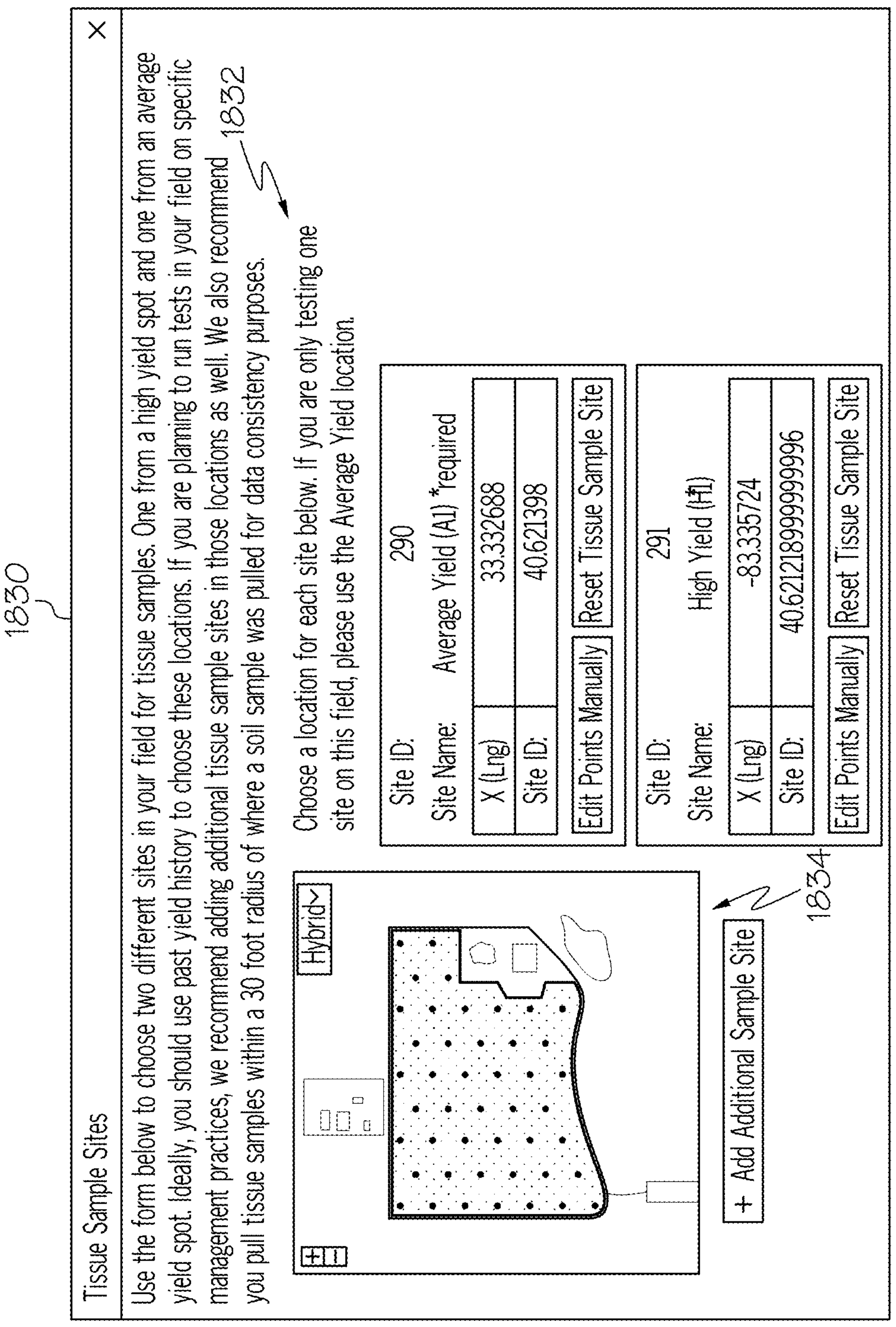
FIG. 18 depicts a user interface for providing tissue sample sites, according to embodiments provided herein.

FIG. 18 depicts a user interface 1830 for providing tissue sample sites, according to embodiments provided herein. As illustrated, the user interface 1830 includes a location section 1832 and a map section 1834, which each provide a location of the sites from which tissue samples were taken. Specifically, the location section 1832 includes a site name column and a yield column for each of the sites from which samples were taken. The map section 1834 may provide an image of the field may be provided, as well as tissue sample results for portions of that field. Options for editing points, resetting tissue sample sites, and adding additional sample sites are also provided.

FIG. 19 depicts a user interface 1930 for providing nutrient data relative to yield goals, according to embodiments provided herein. As illustrated, the user interface 1930 provides a date column, a GDUs column, a nitrogen column, a phosphorus column, a potassium column, a magnesium column, a calcium column, a sulfur column, a zinc column, a manganese column, a copper column, an iron column, a boron column, an aluminum column, a molybdenum column, and a sodium column. A green indicator may represent that the identified nutrient meets a sufficiency level. Yellow may represent that the selected nutrient is moderately deficient. Red may represent that the selected nutrient is significantly deficient.

Figure 20:
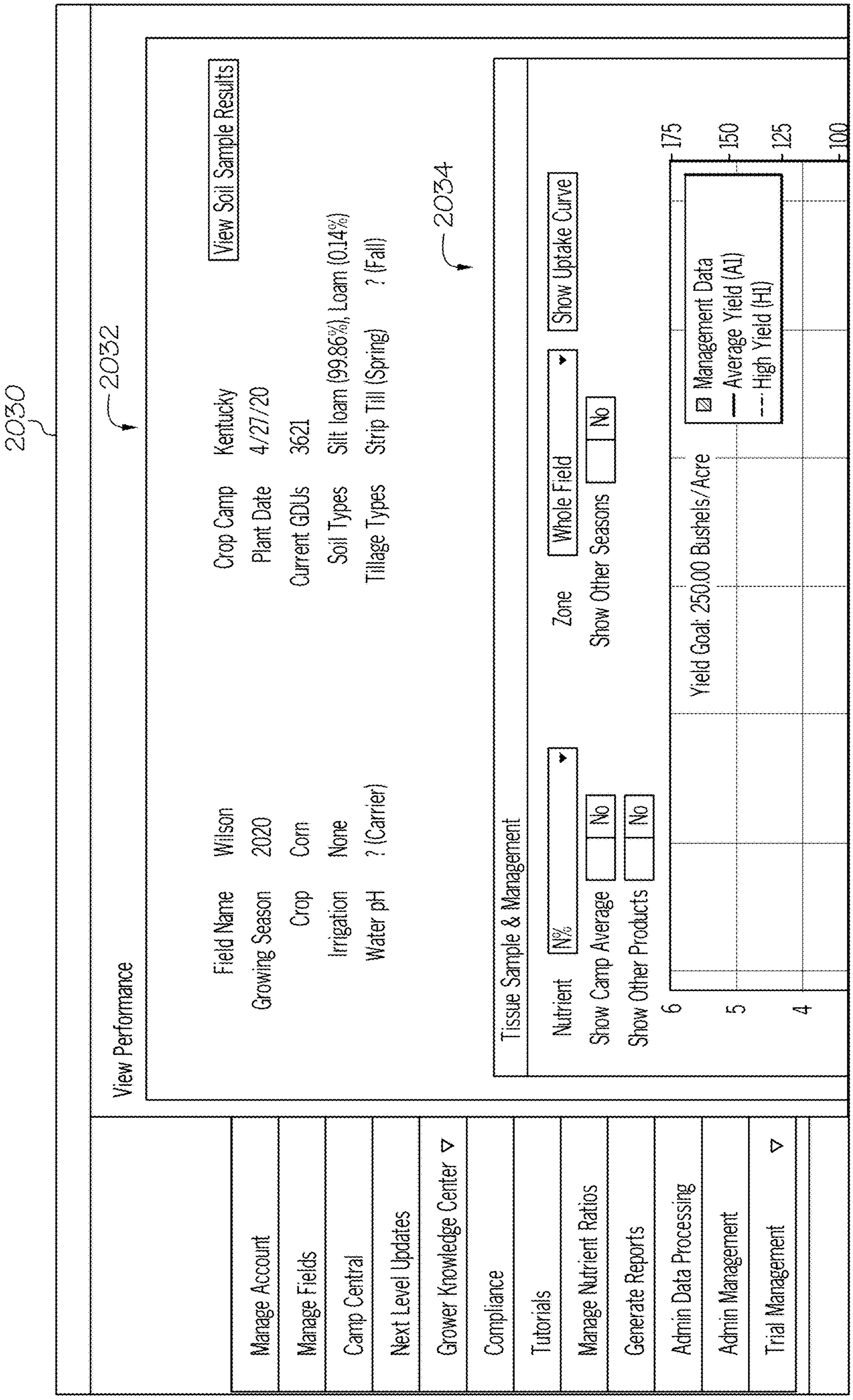
FIG. 20 depicts a user interface for providing performance data, according to embodiments provided herein.

FIG. 20 depicts a user interface 2030 for providing performance data, according to embodiments provided herein. As illustrated, the user interface 2030 may include a field section 2032 and a tissue sample and management section 2034. The field section 2032 may include field information, including field name, growing season, crop, irrigation, water pH, crop camp, plant date, current GDUs, soil types, tillage type, etc. The tissue samples and management section 2034 may include a nutrient option, a camp average option, an other products option, a zone option, and an other season option. The tissue sample and management section 2034 may also graphically depict a nutrient amount over time or space, where different data points may represent an average yield, a high yield, or management data.

Figure 21:
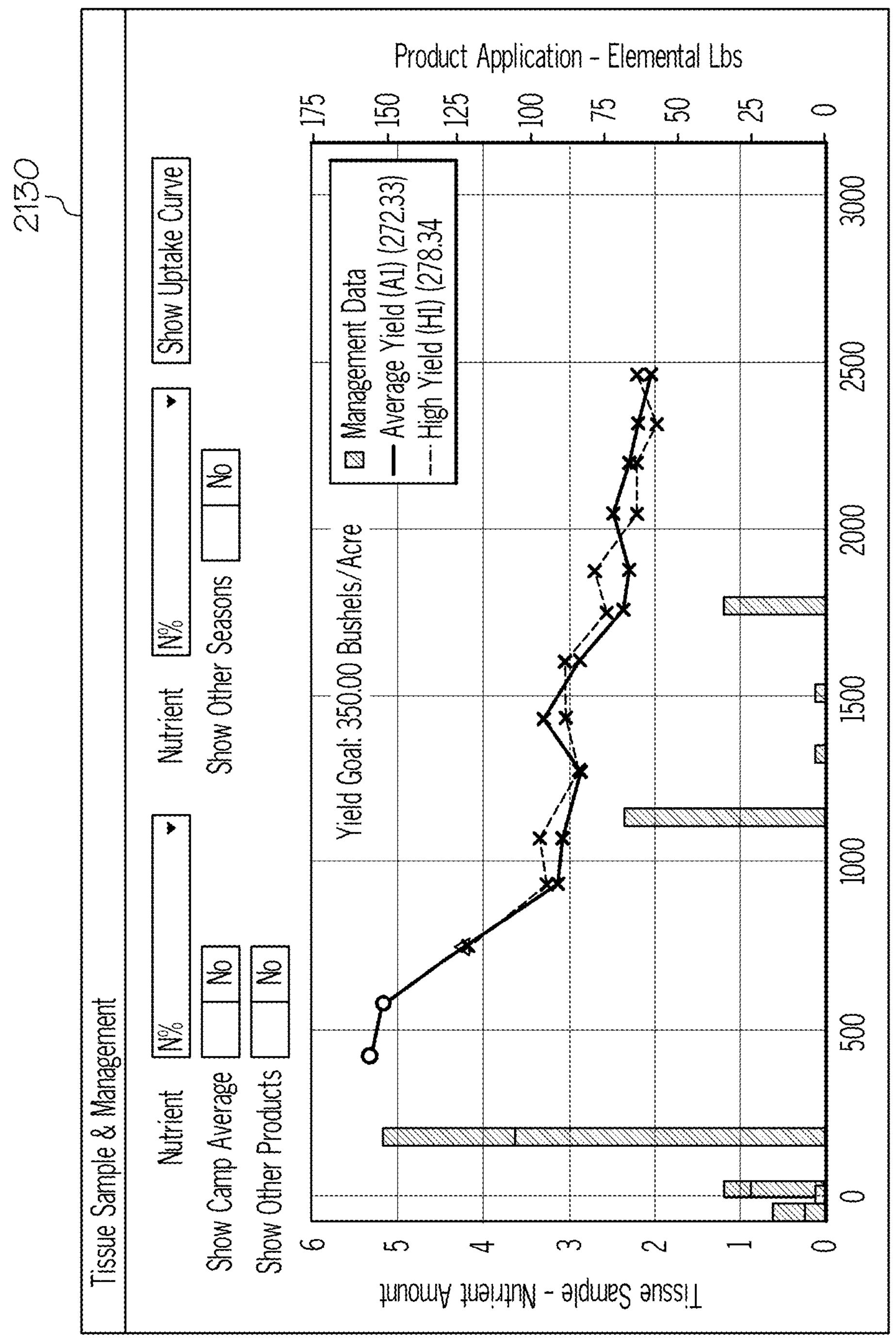
FIG. 21 depicts a user interface for providing tissue sample and management data, according to embodiments provided herein.

FIG. 21 depicts a user interface 2130 for providing tissue sample and management, according to embodiments provided herein. As illustrated, the user interface 2130 provides a nutrient option, a camp average option, an other products option, a zones option, and an other seasons option. The user interface 2130 may also provide a graphical representation of nutrient amount versus sample.

Figure 22:
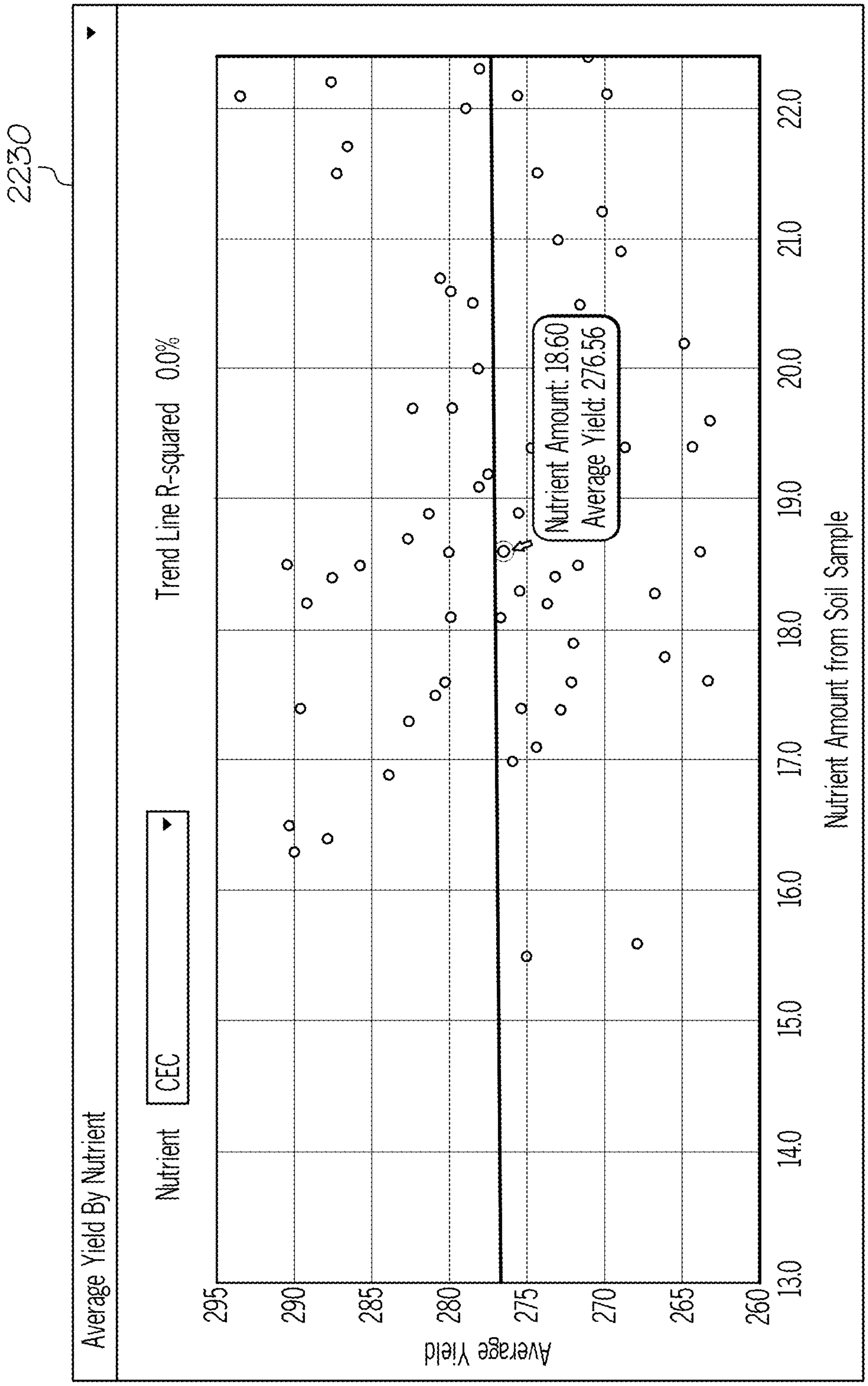
FIG. 22 depicts a user interface for providing average yield data, according to embodiments provided herein.

FIG. 22 depicts a user interface 2230 for providing average yield data, according to embodiments provided herein. As illustrated, the user interface 2230 provides a graphical representation of nutrient amount from soil sample is plotted against average yield.

Figure 23:
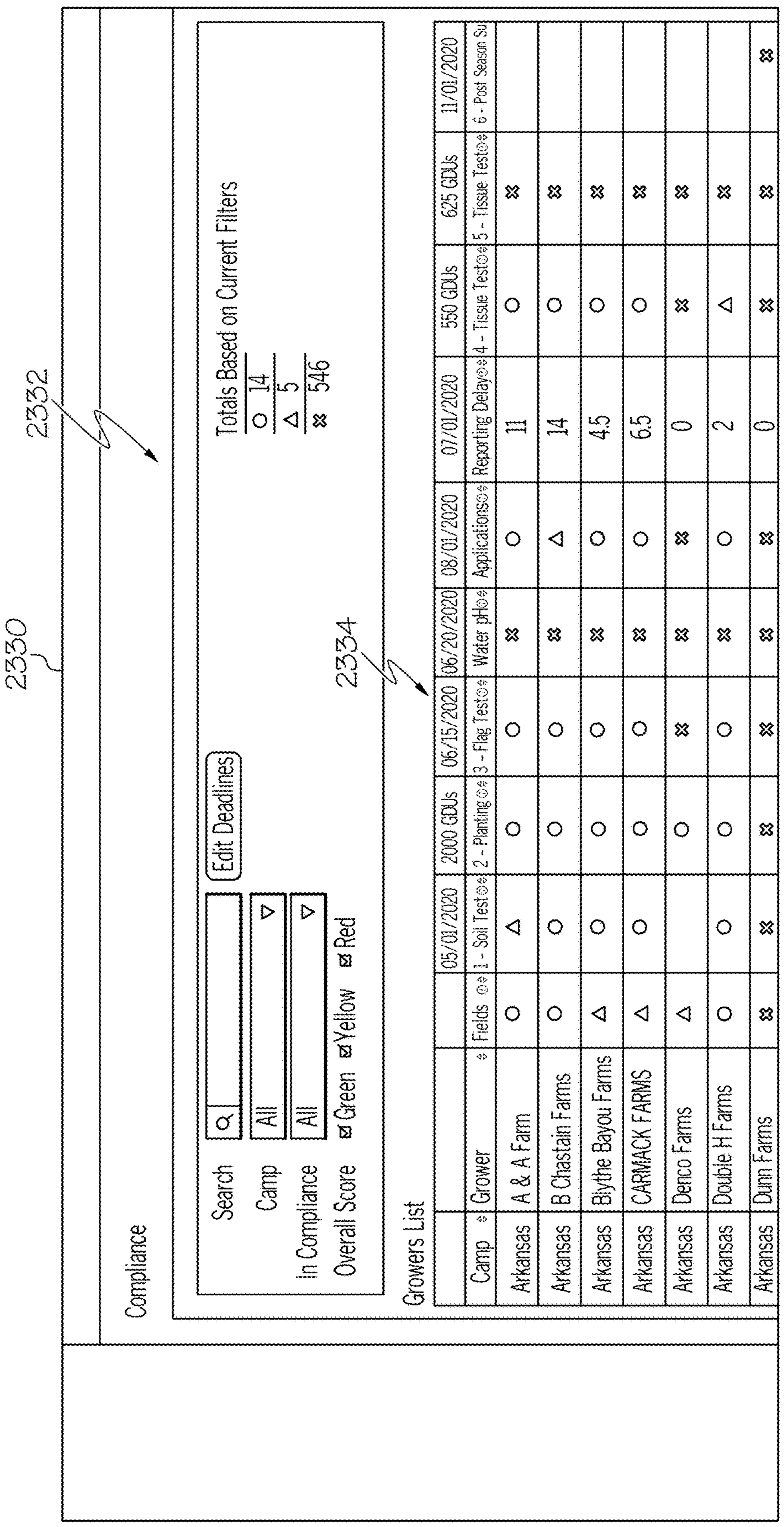
FIG. 23 depicts a user interface for providing compliance data, according to embodiments provided herein.

FIG. 23 depicts a user interface 2330 for providing compliance data, according to embodiments provided herein. As illustrated, the user interface 2330 includes an options section 2332 and a growers list section 2334. The options section 2332 includes a search option, a camp option, and a compliance option. The growers list section 2334 provides a camp column, a grower column, a fields column, a soil test column, a planting column, a flag test column, a water pH column, an applications column, a reporting delay column, a tissue site column, a tissue test column, and a post season sample column. The icons in the matrix of the growers list section 2334 indicate which of these characteristics are acceptable, unacceptable, or moderately acceptable.

Figure 24A:
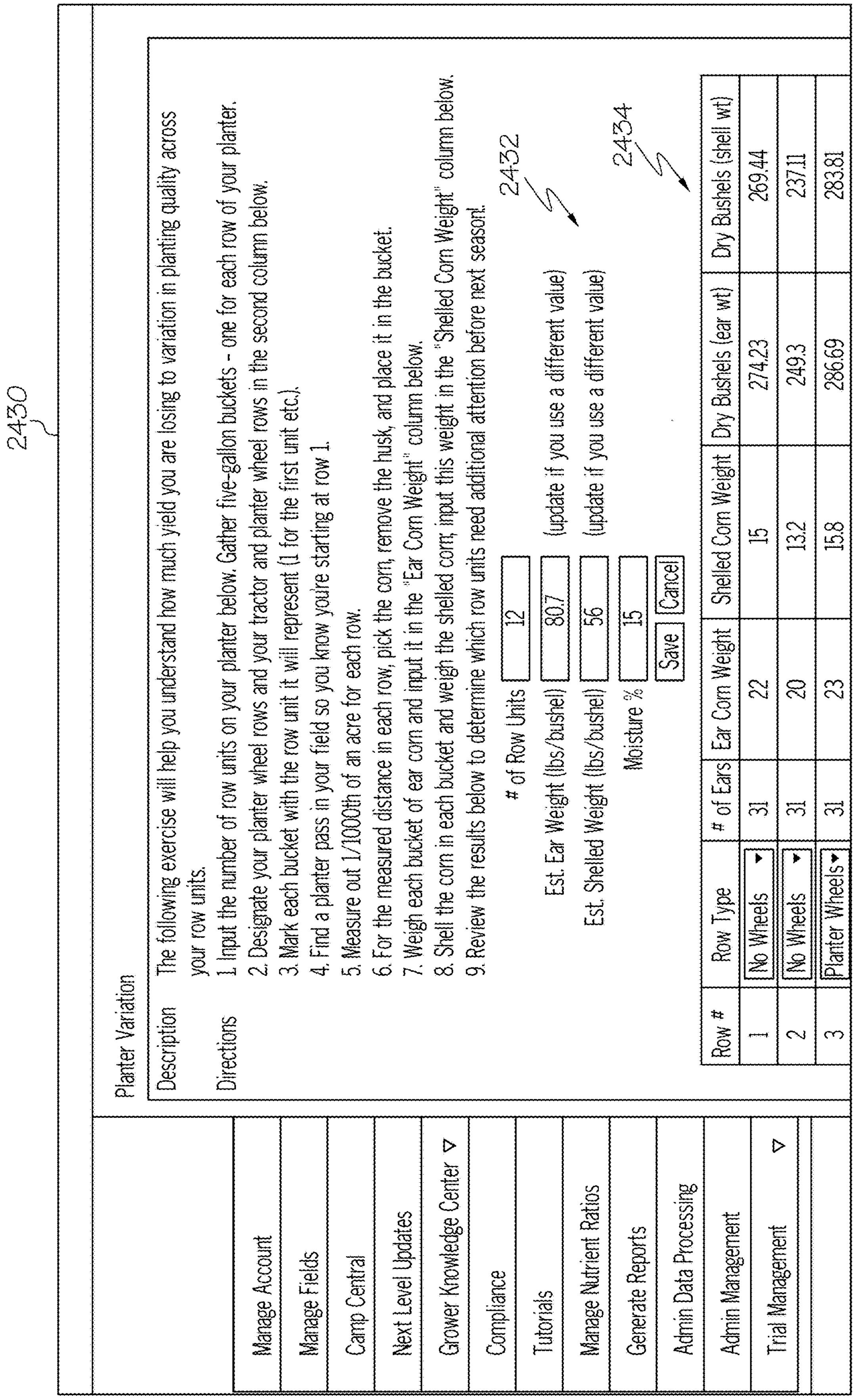
FIGS. 24A, 24B depict a user interface for providing planter variability, according to embodiments provided herein.
Figure 24B:
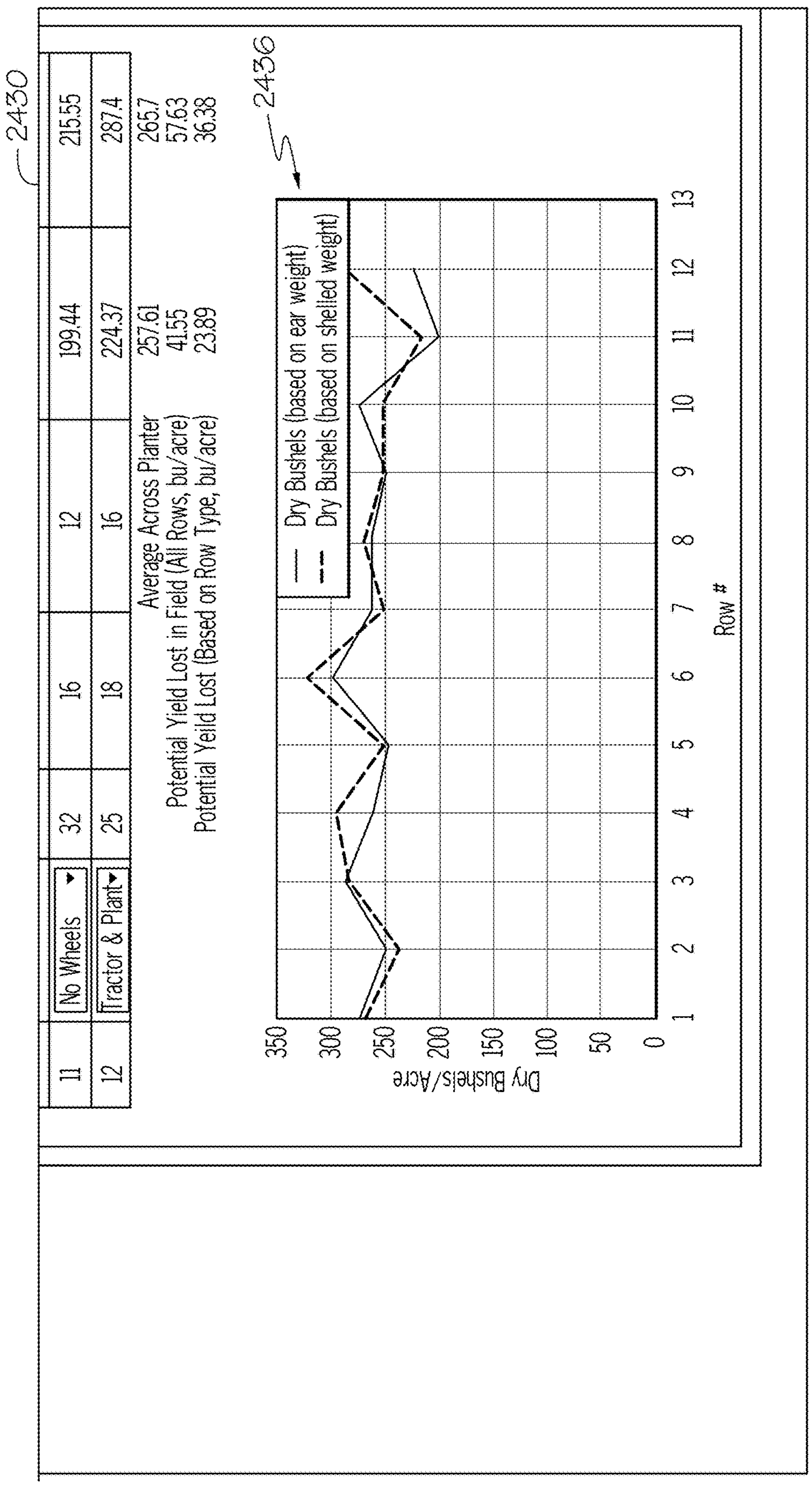

FIGS. 24A, 24B depict a user interface 2430 for providing planter variability, according to embodiments provided herein. As illustrated, the user interface 2430 includes a number of row units field, an ear weight field, a shelled weight field, a moisture percentage field. Also provided are a row number column, a row type column, a number of ears column, an ear corn weight field, a shelled corn weight field, a dry bushels (ear) column, and a dry bushels (shelled) column. Also provided is a graphical representation 2436 of row versus dry bushels per acre.

Accordingly, the embodiment of FIGS. 24A, 24B provides growers with options to measure the output and/or yield across an entire planter. This allows growers to diagnose problems and identify the row units that are not performing as well as the others. Because the test is measured in one area of the field, the test can control for all other variables (weather, soil fertility, seed, etc.) and focuses on one variable; the planter itself. As such, growers complete the test by gathering and weighing the crop. The results may be entered into the user interface 3130. A calculation may be performed for yield lost due to these issues.

Figure 25:
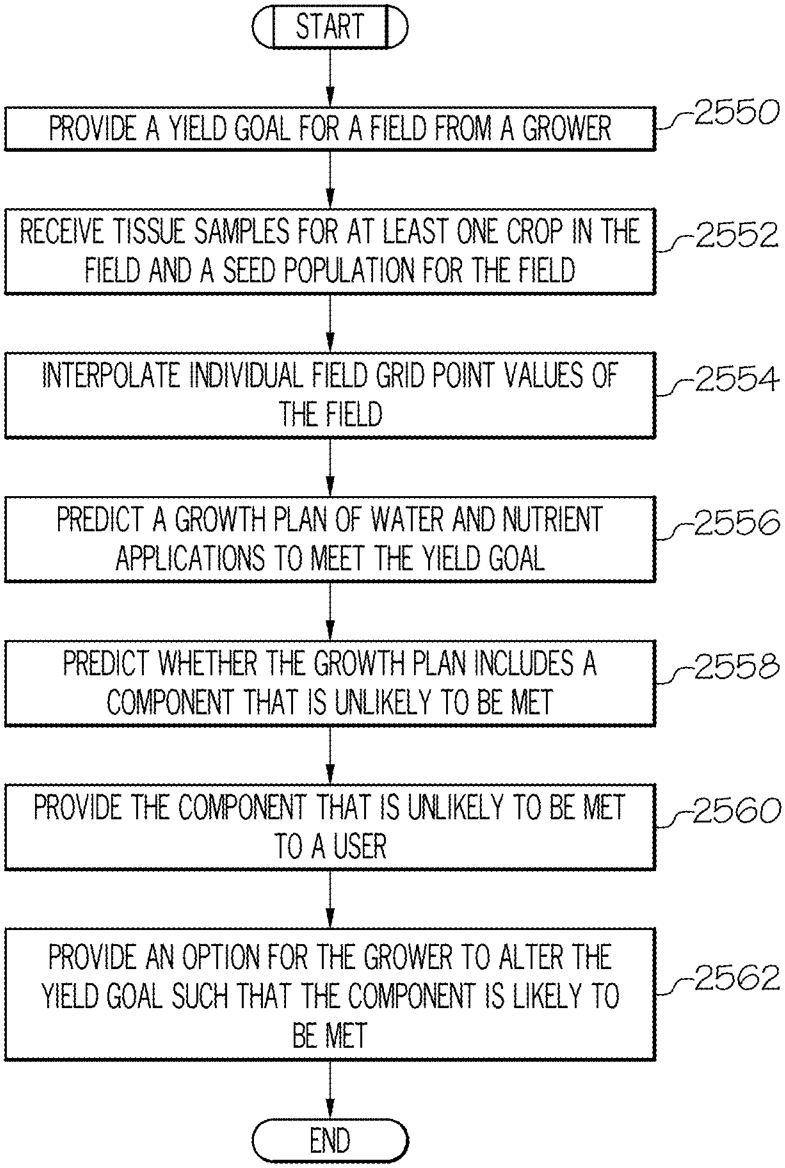
FIG. 25 depicts a flowchart for providing crop management, according to embodiments provided herein.

FIG. 25 depicts a flowchart for providing crop management, according to embodiments provided herein. As illustrated in block 2550, a yield goal for a field may be determined and/or otherwise provided by a grower. In block 2552, tissue samples for at least one crop in the field and a seed population for the field may be received. In block 2554, individual field grid point values of the field may be interpolated. In block 2556, a growth plan of water and nutrient applications to meet the yield goal may be predicted, based on determined sufficiency levels and individual field grid point values of the field. Predicting a growth plan for a field may include determining blocks for the field. Blocks represent segments for a field, where, in some embodiments, there are around 690 blocks in a 40-acre field. Once the blocks are determined, a yield goal for each of the blocks is determined from the received yield goal for the field. Additionally, a determination is made from about 400 different variables over 5,000 previous growing seasons what inputs are needed to achieve the yield goal for a first block. This would be repeated for the other blocks in the field and summed to determine the inputs required to create the growth plan. This portion of the process would take a human in excess of 300 hours for a single block or segment of a field (equating to roughly 207,000 hours or 24 years for a 40-acre field). Thus, this prediction could not be performed by a human using pen and paper because there are far too many variables and not enough time for a human to perform such a prediction with the data still ripe. Additionally, this prediction enhances the technical field of automatic crop yield prediction by creating a growth plan that the grower can rely on as being achievable before expending resources incorrectly.

In block 2558, a prediction may be made regarding whether the growth plan includes a component that is unlikely to be met. In some embodiments, predicting whether the growth plan includes a component that is unlikely to be met includes identifying a yield goal for a first block or predetermined segment of a field; identifying target sufficiency levels for achieving that yield across several hundred variables (weather, soil fertility, seed, etc.); and confirming whether all variables for the actual season exceed the target sufficiency levels. This process would also be repeated for the other blocks in the field. As such, this prediction may be made utilizing around 400 different variables across around 5,000 previous growing seasons to determine sufficient levels for each variable, which would take a human in excess of 200 hours for a single block (equating to roughly 140,000 hours or 16 years for a 40-acre field). Thus, this prediction could not be performed by a human using pen and paper because, again, there are too many variables and not enough time for a human to perform such a prediction with the data still ripe. Additionally, this prediction enhances the technical field of automatic crop yield prediction by checking a viability of the growth plan that the grower can rely on as being achievable before expending resources incorrectly.

In block 2560, in response to predicting that the growth plan includes the component that is unlikely to be met, the component that is unlikely to be met may be determined and provided. In block 2562, an option for the grower to alter the yield goal such that the component is likely to be met may be provided. In some embodiments, operation of crop management equipment 108 may be altered to implement the growth plan. Specifically, some embodiments may be configured to cause the crop management equipment 108 to add more/less fertilizer, more/less herbicide, alter planting, and/or make other modifications to operation to the crop management equipment 108.

It should also be noted that this process adds significantly more than an abstract idea for at least the reason that this is the first technological approach to determining a yield goal and then determining how to meet the yield goal. This new technological approach is not only novel and nonobvious, but also provides enhanced predictability and accuracy in crop yields that have not been previously realized.

Figure 26:
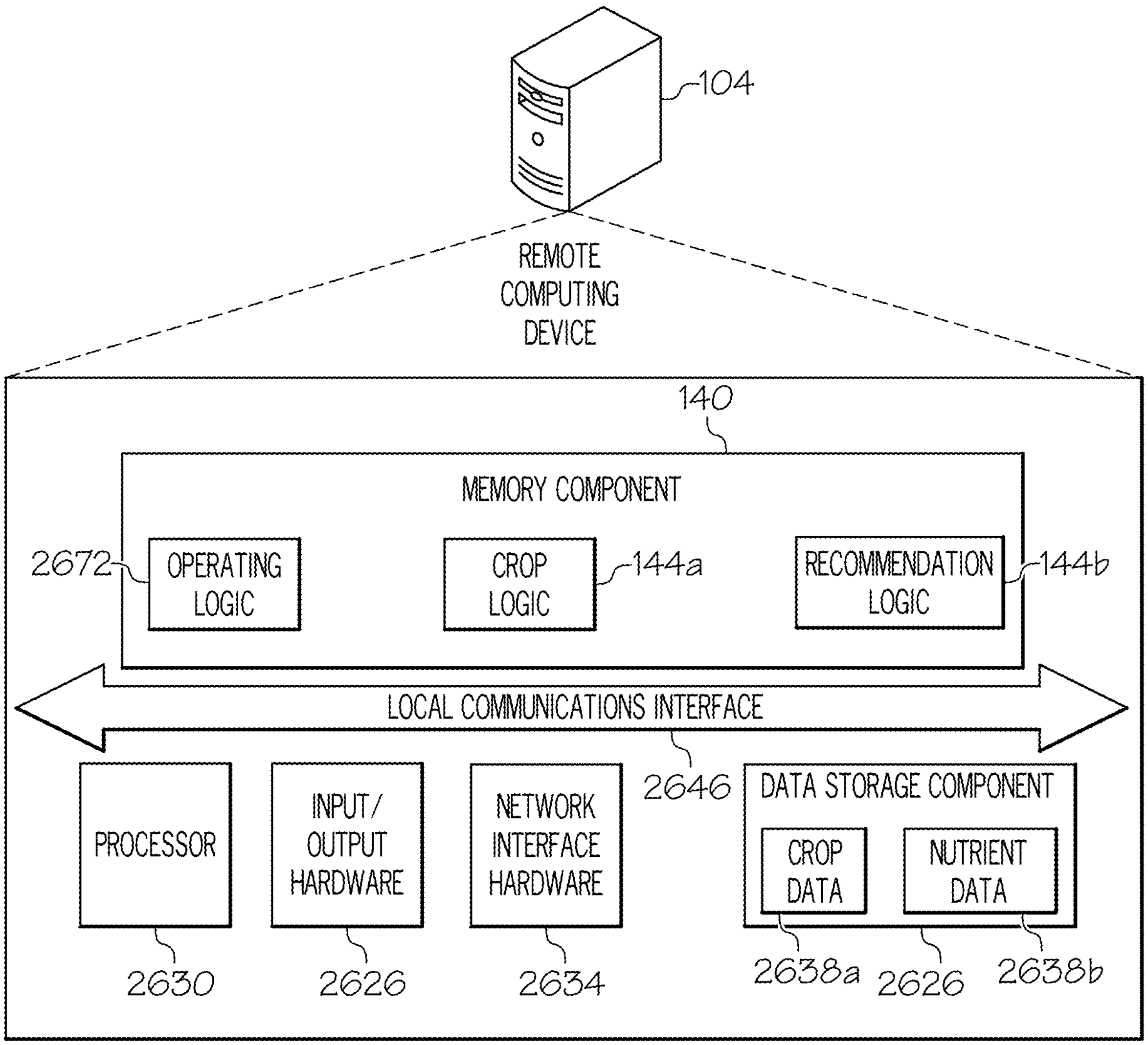
FIG. 26 depicts a computing device for providing crop management, according to embodiments provided herein.

FIG. 26 depicts a remote computing device 104 for providing crop management, according to embodiments provided herein. As illustrated, the remote computing device 104 includes a processor 2630, input/output hardware 2626, network interface hardware 2634, a data storage component 2636 (which stores crop data 2638*a*, nutrient data 2638*b*, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the remote computing device 104 and/or external to the remote computing device 104.

The memory component 140 may store operating system logic 2642, the crop logic 144*a*, and the recommendation logic 144*b*. The crop logic 144*a* and the recommendation logic 144*b* may each include a plurality of different pieces of logic, each of which may be embodied as a computer program or module, firmware, and/or hardware, as an example. A local interface 2646 is also included in FIG. 26 and may be implemented as a bus or other communication interface to facilitate communication among the components of the remote computing device 104.

The processor 2630 may include any processing component operable to receive and execute instructions (such as from a data storage component 2636 and/or the memory component 140). As described above, the input/output hardware 2626 may include and/or be configured to interface with the components of FIG. 26.

The network interface hardware 2634 may include and/or be configured for communicating with any wired or wireless networking hardware, including an antenna, a modem, a LAN port, wireless fidelity (Wi-Fi) card, WiMAX card, mobile communications hardware, and/or other hardware for communicating with other networks and/or devices. From this connection, communication may be facilitated between the remote computing device 104 and other computing devices, such as those depicted in FIG. 1.

The operating system logic 2642 may include an operating system and/or other software for managing components of the remote computing device 104. As discussed above, the crop logic 144*a* may reside in the memory component 140 and may be configured to cause the processor 2630 to determine environment data for calculating altitude uncertainty parameters associated with the crop, soil, etc., as described above. Similarly, the recommendation logic 144*b* may be utilized to provide recommendations regarding improving a return on investment with regard to a field or farm, and/or provide other similar functionality.

It should be understood that while the components in FIG. 26 are illustrated as residing within the remote computing device 104, this is merely an example. In some embodiments, one or more of the components may reside external to the remote computing device 104. It should also be understood that, while the remote computing device 104 is illustrated as a single device, this is also merely an example. In some embodiments, the crop logic 144*a* and the recommendation logic 144*b* may reside on different computing devices. As another example, one or more of the functionalities and/or components described herein may be provided by a remote computing device 104, the user computing device 102, and/or other devices, which may be coupled to the remote computing device 104 via a network connection (wired or wireless). These devices may also include hardware and/or software for performing the functionality described herein.

Additionally, while the remote computing device 104 is illustrated with the crop logic 144*a* and the recommendation logic 144*b* as separate logical components, this is also an example. In some embodiments, a single piece of logic may cause the hub to provide the described functionality.

Figure 27:
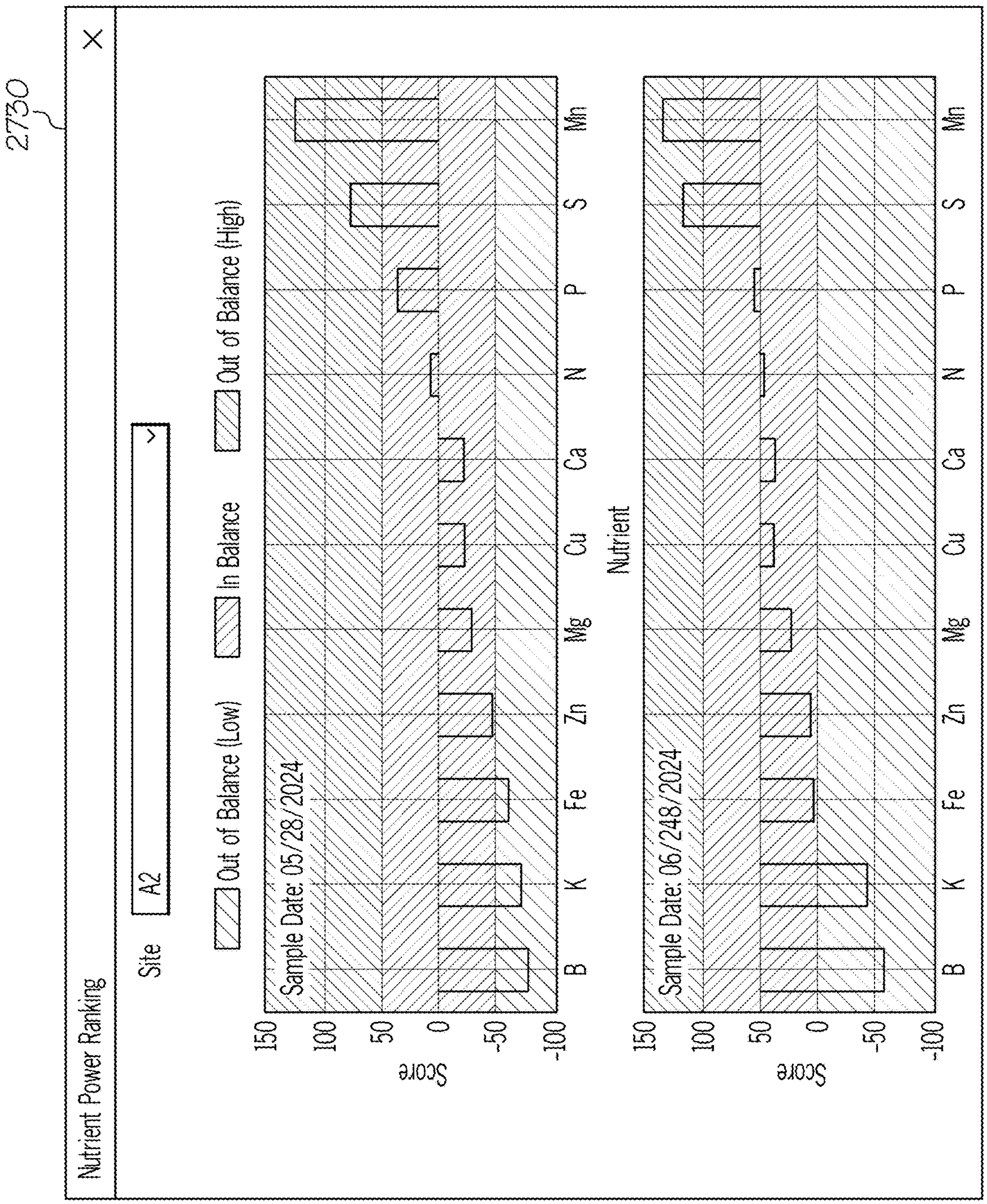
FIG. 27 depicts a user interface for determining a nutrient power ranking, according to embodiments provided herein.

FIG. 27 depicts a user interface for determining a nutrient power ranking, according to embodiments provided herein. The nutrient power ranking provides a rank-order list of nutrients, based on how out of balance they are to optimal levels, based on yield goal and crop timing. This is based on tissue sample values compared to previous observed values with yield results found in our database. Determining the targets requires approximately 110 individual ratio targets and standard deviations to be calculated for each yield goal and crop timing, along with sufficiency levels for each nutrient. The results are based on a combination of if the nutrient is sufficient and how below-target and above-target each nutrient is when found in the numerator of ten ratios (considering standard deviations). These are then added together into an aggregate score and sorted from lowest to highest. This information may be used by customers to determine which nutrients need to be added to achieve optimal balance, resulting in improved yields.

It should be understood that embodiments provided herein are not capable of being performed by a human mind, even with pen and paper. As an example, embodiments provided herein include over 500 growers, over 1,000 users, providing inputs on over 5,000 fields during the year. Additionally, embodiments collect 32 different weather values every day for every field. These embodiments process approximately 250,000 soil grid samples that show 20 values for each sample. These embodiments also receive planting data for approximately 1,500 fields per year. This data comes in several different formats based on the equipment used by the planter to monitor performance and settings. This data is extremely detailed 28,575 records for a 143 acre field (approximately 200 records per field) for example, and we import individually (see below for processing details). This process also exists for variable-rate applications and harvest data.

Additionally, for soil values, embodiments provided herein take the one-acre grids and convert it into 50-foot square sections within a field. These embodiments interpolate the values for each of these field grids to estimate the values for that location based on the overall grids. In a 43-acre field, for example, these embodiments create 804 unique field grids.

For planting data, after importing the individual values, embodiments provided herein average data based on each 50-foot field grid (in the earlier example, 28,575 records are consolidated into 1,668 field grid records with average values for each of four inputs. Doing this manually would be completely cost prohibitive and would be impossible to perform in a manner to use the data in a timely manner for outputs.

Output provided herein includes cumulative weather information every time a field loads (sunlight since planting, rainfall and irrigation, and heat/growing units). Performing this calculation over thousands of fields and hundreds of weekly page loads would be impossible to perform manually.

Embodiments provided herein also use growing units calculations on flag test and applications pages for determining when in the growing season each activity occurred. These embodiments display field grid information on several maps. For tissue samples, embodiments determine sufficiency levels based on several inputs from the field level, and compare that to the actual level achieved on the tissue result. These embodiments perform a separate calculation for each nutrient and each tissue results at each tissue site. One page load can contain over 100 of these individual calculations, which would represent at least 10 hours of work for a person to perform manually. Growers visit this page over 500 times every week, meaning over 5,000 hours of manual work, if such could be possible.

After the soil data is uploaded and processed, and the individual field grid point values are interpolated, growers are then required to determine yield goals for each individual field grid. Embodiments perform this by drawing on the electronic map or uploading a file containing this information for importing. Once each grid has a goal defined, these embodiments determine a target sufficiency level for each nutrient at each field grid point based on multiple inputs from the interpolated results. A map is rendered showing where each grid points' interpolated (current) nutrient value falls in comparison to the calculated target (very far below through very far above). The user can then view this map for each separate nutrient.

Adjustments to current levels may be made by making applications, which are built on additional assumptions of how much product is needed to address the deficit. Embodiments may determine the product to be used, and may calculate at the field grid level how much product should be applied based on these calculations.

These embodiments provide a summary of the amount needed in total, and allow the users to export a map for each of the products to be applied. This map can be input into a piece of equipment designed to apply the nutrients at a variable rate across the field based on our instructions.

These embodiments may update the interpolated values on the main map to establish a new baseline, so that multiple products can affect the same nutrients to reach the final target level of sufficiency.

As such, completing the above activity for soil recommendations on a single, 40-acre field would be impossible to perform manually, as this would represents at least a month of labor, because it would not be delivered in a timely fashion, based on the necessary and timely maintenance for a crop. It is estimated that most users perform this function on 25+ fields at a time, thus representing at least four months of manually.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for providing crop management. It should also be understood that these embodiments are merely exemplary and are not intended to limit the scope of this disclosure.

What is claimed is:

1. A method for controlling crop management equipment comprising:

receiving, by a computing device, a yield goal for a field from a grower;

receiving, by the computing device, from a data collection device, tissue samples for at least one crop in the field and a seed population for the field;

determining, by the computing device, a current nutrient amount for each nutrient tested from the tissue to create individual field point values;

predicting, by the computing device, a growth plan of water and nutrient applications to meet the yield goal, based on determined sufficiency levels to meet the yield goal and the individual field point values of the field;

predicting, by the computing device, whether the growth plan includes a component that is unlikely to be met to achieve the yield goal;

in response to predicting that the growth plan includes the component that is unlikely to be met, providing, by the computing device, the component that is unlikely to be met to a user;

providing, by the computing device, an option for the grower to alter the yield goal such that the component is likely to be met; and in response to predicting that the growth plan is likely to be met, altering operation of crop management equipment to implement the growth plan, wherein altering operation of crop management equipment includes automatically altering an input to the field.

2. The method of claim 1, further comprising:

performing a flag test to identify an uneven emergence tax on the field;

determining results for the flag test, which includes at least one of the following: a date, a time, a color, a count, a soil temperature, growing degree units (GDUs), a GDU delta, or the uneven emergence tax; and providing recommendations in subsequent grow cycles to reduce an emergence tax on the field.

3. The method of claim 1, further comprising recommending a prescribed amount of water and a prescribed nutrient to reach the yield goal.

4. The method of claim 1, further comprising determining a cost of meeting the yield goal, wherein the cost includes at least one of the following: a product cost, an application cost, a total cost, or a per acre cost.

5. The method of claim 1, further comprising determining sufficiency levels for the field, which is predicted to have a positive effect on a yield of the field.

6. A system for controlling crop management equipment comprising:

a data collection device that includes at least one senor for collecting data associated with a crop for a field; and a computing device that includes logic, that when executed by the computing device, causes the system to perform at least the following:

provide a yield goal for the crop from a grower;

receive, via the data collection device, soil sample data for at least a portion of the crop and a seed population for the crop;

determine a current nutrient amount for each nutrient tested from the soil sample data at a plurality of individual field points in a predetermined field grid for the field to create individual field point values;

interpolate individual field grid point values of the crop into the predetermined field grid;

predict a growth plan of water and nutrient applications to meet the yield goal, based on determined sufficiency levels to meet the yield goal and the individual field grid point values of the crop;

predict whether the growth plan includes a component that is unlikely to be met;

in response to predicting that the growth plan includes the component that is unlikely to be met, provide the component that is unlikely to be met to a user;

provide an option for the grower to alter the yield goal such that the component is likely to be met; and in response to predicting that the growth plan is likely to be met, alter operation of crop management equipment to implement the growth plan, wherein altering operation of crop management equipment includes automatically altering an input to the field.

7. The system of claim 6, further comprising crop management equipment, wherein the crop management equipment includes at least one of the following: a tractor, a seeder, or a harvester, and wherein the logic is further configured to cause the system to automatically alter operation of the crop management equipment to implement the growth plan in response to predicting that the growth plan is likely to be met.

8. The system of claim 6, wherein the logic further causes the system to perform a flag test to identify an uneven emergence tax on the crop.

9. The system of claim 8, wherein the logic further causes the system to determine results for the flag test, which include at least one of the following: a date, a time, a color, a count, a soil temperature, growing degree units (GDUs), a GDU delta, or the uneven emergence tax.

10. The system of claim 8, wherein the logic further causes the system to provide recommendations in subsequent grow cycles to reduce an emergence tax on the crop.

11. The system of claim 6, wherein the logic further causes the system to recommend a prescribed amount of water and a prescribed nutrient to reach the yield goal.

12. The system of claim 6, wherein the logic further causes the system to determine a cost of meeting the yield goal, wherein the cost includes at least one of the following: a product cost, an application cost, a total cost, or a per acre cost.

13. The system of claim 6, wherein the logic further causes the system to determine sufficiency levels for the crop, which is predicted to have a positive effect on a yield of the crop.

14. A non-transitory computer-readable medium that stores logic that, when executed by a computing device, causes the computing device to perform at least the following:

provide a yield goal for a plurality of crops for a field;

receive soil samples for at least a portion of the plurality of crops and a seed population for the plurality of crops;

determine a current nutrient amount for each nutrient tested from the soil samples at a plurality of individual field points in a predetermined field grid for the field to create individual field point values;

interpolate individual field grid point values of the plurality of crops into the predetermined field grid;

predict a growth plan of water and nutrient applications to meet the yield goal, based on determined sufficiency levels to meet the yield goal and the individual field grid point values of at least a portion of the plurality of crops;

predict whether the growth plan includes a component that is unlikely to be met;

in response to predicting that the growth plan includes the component that is unlikely to be met, provide the component that is unlikely to be met to a user;

provide an option for the user to alter the yield goal such that the component is likely to be met; and in response to predicting that the growth plan is likely to be met, alter operation of crop management equipment to implement the growth plan, wherein altering operation of crop management equipment includes automatically altering an input to the field.

15. The non-transitory computer-readable medium of claim 14, wherein the logic further causes the computing device to perform at least the following:

perform a flag test to identify an uneven emergence tax on the plurality of crops; and determine results for the flag test, which includes at least one of the following: a date, a time, a color, a count, a soil temperature, growing degree units (GDUs), a GDU delta, or the uneven emergence tax.

16. The non-transitory computer-readable medium of claim 15, wherein the logic further causes the computing device to provide recommendations in subsequent grow cycles to reduce an emergence tax on the plurality of crops.

17. The non-transitory computer-readable medium of claim 14, wherein the logic further causes the computing device to recommend a prescribed amount of and a prescribed nutrient to reach the yield goal.

18. The non-transitory computer-readable medium of claim 14, wherein the logic further causes the computing device to determine a cost of meeting the yield goal, wherein the cost includes at least one of the following: a product cost, an application cost, a total cost, or a per acre cost.

* * * * *